(12) United States Patent
Tsai et al.

(10) Patent No.: US 11,617,060 B2
(45) Date of Patent: Mar. 28, 2023

(54) INTEGRATED INTELLIGENT BUILDING MANAGEMENT SYSTEM

(71) Applicant: Chicony Power Technology Co., Ltd., New Taipei (TW)

(72) Inventors: Jewel Tsai, New Taipei (TW); Chen-Hsiang Chen, New Taipei (TW)

(73) Assignee: CHICONY POWER TECHNOLOGY CO., LTD., NewTaipei (TW)

( * ) Notice: Subject to any disclaimer, the term of this patent is extended or adjusted under 35 U.S.C. 154(b) by 0 days.

(21) Appl. No.: 17/377,226

(22) Filed: Jul. 15, 2021

(65) Prior Publication Data

US 2022/0022007 A1 Jan. 20, 2022

Related U.S. Application Data

(60) Provisional application No. 63/053,543, filed on Jul. 17, 2020.

(30) Foreign Application Priority Data

Jun. 16, 2021 (TW) ................................. 110121842

(51) Int. Cl.
*H04W 4/029* (2018.01)
*H04W 4/33* (2018.01)
*G06N 20/00* (2019.01)

(52) U.S. Cl.
CPC ............ *H04W 4/029* (2018.02); *H04W 4/33* (2018.02); *G06N 20/00* (2019.01)

(58) Field of Classification Search
CPC ........ H04W 4/029; H04W 4/33; G06N 20/00; G06N 3/04; G06F 16/904; G06Q 50/08

(Continued)

(56) References Cited

U.S. PATENT DOCUMENTS 10,985,938 B2 * 4/2021 Krasadakis ............ G06V 20/40
2005/0192025 A1 9/2005 Kaplan
(Continued)

FOREIGN PATENT DOCUMENTS

CN 103673090 A * 3/2014
CN 102759173 B 9/2014
(Continued)

OTHER PUBLICATIONS

Office Action dated May 30, 2022 of the corresponding Taiwan patent application No. 110121842.

*Primary Examiner* — Hirdepal Singh
(74) *Attorney, Agent, or Firm* — Chun-Ming Shih; HDLS IPR Services

(57) ABSTRACT

An integrated intelligent building management system includes: a positioning device, recording and uploading a movement information and a device-assigned ID of a target person; an intelligent building kit, computing a tracking information of the target person in a monitoring range based on multiple location coordinates in multiple time periods, and transforming multiple device-assigned IDs to the same kit-assigned ID when multiple device-assigned IDs are determined to be corresponding to the same target person based on the tracking information, and uploading the kit-assigned ID and the movement information; and an intelligent building system, computing the tracking information of the target person in a monitoring range based on the location coordinates in multiple time periods, and establishing an information connection of multiple kit-assigned IDs when the multiple kit-assigned IDs are determined to be corresponding to the same target person based on the tracking information.

19 Claims, 11 Drawing Sheets

(58) Field of Classification Search
USPC .................................................. 455/456.1
See application file for complete search history.

(56) References Cited

U.S. PATENT DOCUMENTS

| | | |
|---|---|---|
| 2005/0227677 A1 | 10/2005 | Kallio |
| 2012/0005046 A1 | 1/2012 | Wu |
| 2013/0029693 A1 | 1/2013 | Bradley, Jr. et al. |
| 2013/0175931 A1 | 7/2013 | Sadwick |
| 2013/0268383 A1 | 10/2013 | Paolini |
| 2015/0172856 A1* | 6/2015 | Vanderwater ......... H04W 4/021 455/457 |
| 2016/0283578 A1 | 9/2016 | Buck et al. |
| 2017/0328595 A1 | 11/2017 | Iwasaki et al. |
| 2020/0116373 A1 | 4/2020 | Guan et al. |
| 2022/0036302 A1* | 2/2022 | Cella ..................... G06N 5/04 |
| 2022/0068099 A1* | 3/2022 | Beg ....................... H04W 4/33 |

FOREIGN PATENT DOCUMENTS

| | | |
|---|---|---|
| CN | 103673090 B | 6/2016 |
| CN | 107517260 A | 12/2017 |
| CN | 104915225 B | 5/2018 |
| CN | 110653829 A | 1/2020 |
| CN | 111832811 A | 10/2020 |
| TW | 201420970 A | 6/2014 |
| TW | 201421284 A | 6/2014 |
| TW | 201724917 A | 7/2017 |
| TW | 202001925 A | 1/2020 |

\* cited by examiner

INTEGRATED INTELLIGENT BUILDING MANAGEMENT SYSTEM

CROSS-REFERENCE TO RELATED APPLICATIONS

This patent application claims the benefit of U.S. Provisional Patent Application No. 63/053,543 filed Jul. 17, 2020, which is incorporated by reference herein.

BACKGROUND

Technical Field

This disclosure relates to a building system, and particularly relates to an integrated building management system, which may perform the intelligent control to the building based on the status of the persons in the building.

Description of Related Art

In recent years, with the development in the technologies of computer, the Internet, and big data, all kinds of management operation of buildings are developed in the direction toward intellectualization to improve the living quality or working performance of the users inside the buildings.

Generally, the related-art intelligent building management system emphasizes on the intelligent control to the building, such as performing the intelligent control for inside of the building through the parameters like the population in the building, the preset schedule, the needs for the specific space (for example, the meeting room), etc.

The control parameters adopted by the related-art intelligent building management system during the intelligent control are not comprehensive enough. For example, the parameters like the population in the area and the temperatures may merely be sensed by the sensors for performing the corresponding control (for example, controlling the temperature of the air-conditioning, the illumination of the light, etc.) to the area.

However, the related-art intelligent building management system lacks a tracking system with desirable quality and is unable to monitor the parameters, such as population density, the activity level, and the percentage of area size occupied by persons, etc., of each area, thereby the control effect is limited. Further, the positioning technologies for the person in the related art are mainly for the positioning on the planar space. Thus, the tracking for the person across different areas or different floors may not be achieved.

As mentioned above, the related-art intelligent building management system needs to be improved.

SUMMARY OF THE DISCLOSURE

The object of this disclosure is to provide an integrated intelligent building management system, which may effectively perform the positioning and tracking for the target person on each area in the building and perform the intelligent control to each area based on the status of the target person.

In some embodiments of the present disclosure, an integrated intelligent building management system includes:

at least one positioning device, disposed in an area inside a building, when at least one target person is detected in the area, setting a device-assigned ID to the target person, recording a movement information of the target person according to a sampling rate, and uploading the device-assigned ID and the movement information according to a first uploading frequency; the movement information includes a location coordinate and a coordinate of leaving a positioning range of the target person;

at least one intelligent building kit, connected with the at least one positioning device, continuously receiving the device-assigned ID and the movement information of the target person from the positioning device, computing a moving track and an average moving speed of the target person in the positioning range of the positioning device according to the location coordinates of the target person in multiple past time periods, when a plurality of the device-assigned IDs uploaded by a plurality of the positioning devices adjacent to each other are determined to be corresponding to the same target person according to the coordinate of leaving the positioning range, the moving track, and the average moving speed, transforming the multiple device-assigned IDs to a kit-assigned ID, and uploading the kit-assigned ID and the movement information of the target person according to a second uploading frequency; and an intelligent building system, including a data manager and connected with the at least one intelligent building kit, continuously receiving the kit-assigned ID and the movement information of the target person from the intelligent building kit, computing the moving track and the average moving speed of the target person in a monitoring range of the intelligent building kit according to the location coordinates of the target person in the multiple past time periods, and when a plurality of the kit-assigned IDs uploaded by a plurality of the intelligent building kits adjacent to each other are determined to be corresponding to the same target person according to the coordinate of leaving the positioning range, the moving track, and the average moving speed, establishing an information connection for the multiple kit-assigned IDs, the intelligent building kit includes an edge computation module, selecting an environment optimization parameter correspondingly in real-time to execute an intelligent control procedure to the area according to a population density and a person activity level in the area.

Comparing to the related art, this disclosure may achieve the technical functions as below. The positioning and tracking for the person in multi-area or multi-floor may be performed in the building, and the intelligent computation analysis may be performed to each area in the building accordingly based on all the statuses of the persons in the building. Further, linkage control in multi-area may be achieved.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
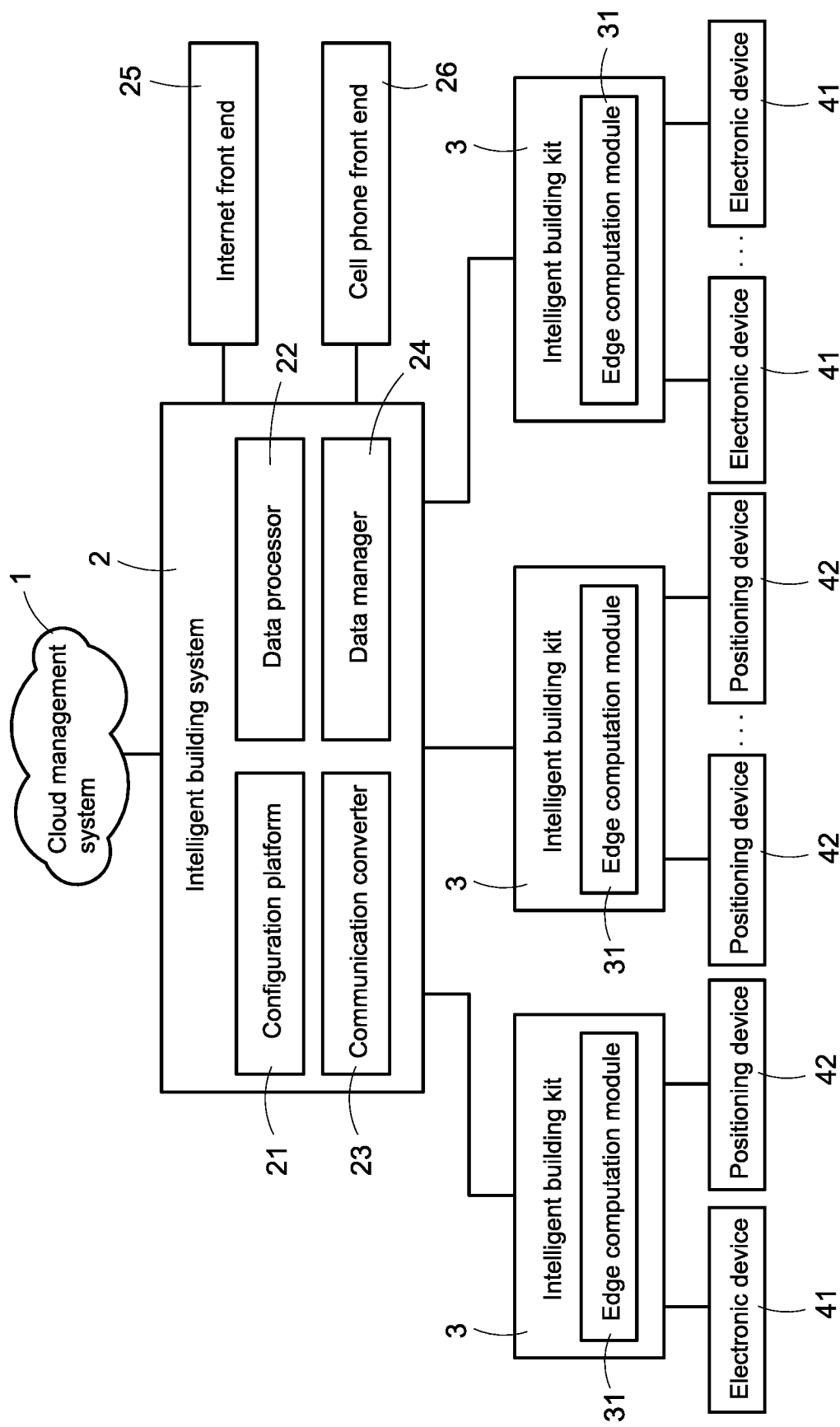
FIG. 1 is a schematic view of the integrated building management system in the first embodiment of this disclosure.

Refer to FIG. 1, which is a schematic view of the integrated building management system in the first embodiment of this disclosure. This disclosure provides an integrated intelligent building management system (hereafter as the integrated management system). The integrated management system at least includes a cloud management system 1, at least one intelligent building system 2 connected to and managed by the cloud management system 1, and at least one intelligent building kit 3 connected to the intelligent building system 2. In some embodiments, the intelligent building system 2 manages one building. The intelligent building kit 3 manages the physical devices (for example, the electronic device 41 and the positioning device 42 in FIG. 1, here is not intended to be limiting) practically disposed in one or multiple areas of the building.

In some embodiments, the cloud management system 1 may have a cloud configuration platform (not shown in the figures). The cloud management system 1 may be a virtual system established on the cloud space, such as Amazon web services (AWS). The cloud configuration platform is a virtual unit implemented by software. The cloud management system 1 is used to manage one or multiple projects. The project includes the related data of the buildings, of which all the intelligent building systems 2 connected under the cloud management system 1 are in charge.

The cloud management system 1 may accept the configuration from the manager through the cloud configuration platform to establish and manage at least one project. In some embodiments, the cloud management system 1 is connected with one or multiple intelligent building systems 2 through a wired or a wireless communication interface. Each intelligent building system 2 is in charge of managing one building in the project.

Specifically, the intelligent building system 2 practically receives the feedback data of the multiple devices (for example, the electronic device 41 and the positioning device 42) inside the building through at least one intelligent building kit 3. The cloud management system 1 may receive the feedback data from each intelligent building system 2 through the communication interface to perform the intelligent control to each building.

In some embodiments, the cloud configuration platform of the cloud management system 1 may accept external operation to establish the one or multiple projects, and may import, establish, and manage the planar graph and 3D model (for example, providing the transformation service for building information modeling (BIM), or managing the transformed BIM model) of one or multiple buildings in each project, and may configure the communication protocol of all kinds of devices possibly included in each building.

It should be noted that the cloud management system 1 is disposed on the cloud. Thus, when the same or different managers establish different projects or configure different buildings, the manager may directly use the defined data (for example, the communication protocol of the device) in the cloud management system 1. As a result, the integrated management system of this disclosure may effectively save time cost when the manager needs to establish the device data of the same or similar device repeatedly.

When the manager finishes the actions (for example, establishing the project, importing BIM model, defining the communication protocol of the device, etc.) through operating the cloud management system 1, the cloud management system 1 may generate the corresponding cloud configuration file and release to the connected one or multiple intelligent building systems 2 for synchronizing with the intelligent building systems 2 according to the cloud configuration file.

As described above, the intelligent building system 2 is used to manage one building connected under, the cloud management system 1 is used to manage one or multiple projects including the data of one or multiple buildings. In other words, the hierarchy of the cloud management system 1 is higher than the hierarchy of the intelligent building system 2. Therefore, when the intelligent building system 2 receives the cloud configuration file released by the cloud management system 1, the configuration procedure of the intelligent building system 2 is restricted by the cloud configuration file. On the other hand, the cloud configuration file already includes most of the configuration parameters (for example, the communication protocols of all devices). The manager does not need to configure those configuration parameters in the intelligent building system 2 separately. Thus, the configuration time may be saved effectively.

In some embodiments, the intelligent building system 2 may be implemented by executing the computer-readable program in the physical computer or server. In other words, the intelligent building system 2 may be a software system or a hardware system implemented by combining software and hardware and used to perform configuration, management, data analysis, and intelligent control to the specified building. In FIG. 1, the intelligent building system 2 includes a configuration platform 21, a data processor 22, a communication convertor 23, and a data manager 24. The configuration platform 21, the data processor 22, the communication convertor 23, and the data manager 24 may be the virtual units implemented by software or the physical elements implemented by hardware. Here is not intended to be limiting.

The configuration platform 21 receives the cloud configuration file from the cloud management system 1, and configures the intelligent building system 2 and multiple devices in the building, which the intelligent building system 2 is in charge of, according to the cloud configuration file, and generates the ground configuration file correspondingly based on the configuration result.

For example, the configuration platform 21 may accept external operation from the manager through the Internet or physical wire to configure the displayable related information on the Internet front end 25 or cell phone front end 26 connected to the intelligent building system 2. For another example, the configuration platform 21 may configure the kit properties of one or multiple intelligent building kits 3 connected to the intelligent building system 2 by external operation.

The data processor 22 is used to statistically analyze the data collected from the building being managed. Specifically, the intelligent building system 2 is connected with the multiple devices in the building mainly through one or multiple intelligent building kits 3 and collects the feedback information of the devices. Further, the intelligent building system 2 statistically analyzes and records the feedback information through the data processor 22 to perform intelligent control to the area where the multiple devices are located (described hereafter).

In some embodiments, the intelligent building system 2 may use the data processor 22 as an interface module with the cloud management system 1. Specifically, the intelligent building system 2 collects and organizes the uploaded data from all the intelligent building kits 3 connected thereto through the data processor 22, and uploads to the cloud management system 1 for storage, management, and analysis.

The communication convertor 23 is used to establish the communication between the intelligent building system 2 and the building. In some embodiments, the communication convertor 23 may be a message queuing telemetry transport broker (MQTT broker). For example, the communication convertor 23 is carried out by standard Mosquitto 1.5.4. Here is not intended to be limiting. The intelligent building system 2 establishes subscription rule through the communication convertor 23 to respectively perform message delivery with the components, such as each intelligent building kit 3, the configuration platform 21, the Internet front-end 51, and the cell phone front-end 52, etc.

The data manager 24 is used to store the corresponding data of the intelligent building system 2 and may include a real-time database and a history database (not shown in figures). Specifically, the real-time database may be a database using MySQL and is used to record relatively real-time data, such as the cloud configuration file and/or the ground configuration file. The history database may be a database using MongoDB and is used to record the historical records of the intelligent building system 2, each intelligent building kit 3, and/or each device.

In one embodiment, the intelligent building system 2 may perform data backup and recovery of the cloud configuration file and/or the ground configuration file through the data manager 24. Thus, the intelligent building system 2 may achieve the object of database backup through the data manager 24.

As shown in FIG. 1, multiple electronic devices 41 (for example, the lighting device, air-conditioning device, image device, etc.) and positioning devices 42 (for example, the image-type positioning device, tag-type positioning device, non-tag-type positioning device, etc.) may be disposed in the building, and the intelligent building system 2 may connect with the devices through multiple intelligent building kits 3. In other words, the intelligent building kit 3 is a relay layer between the intelligent building system 2 and the device on the bottom end.

In one embodiment, the data processor 22 of the intelligent building system 2 includes a data receiving unit (not shown in figures) used to receive the device data uploaded by the intelligent building kit 3, a command processing unit (not shown in figures) used to receive the command request of the Internet front end 25 or the cell phone front end 26, and a cloud interface connecting unit (not shown in figures) for uploading the device data being received to the cloud management system 1.

As shown in FIG. 1, the intelligent building kit 3 may include an edge computation module 31. The edge computation module 31 may execute the intelligent computing analytical function correspondingly according to the device data being received. Specifically, after the device data of the connected device is periodically obtained, the intelligent building kit 3 may perform the analytical action correspondingly to the device data through edge computation module 31. Further, after the intelligent control is performed to the area where the device is located based on the analysis result, the intelligent building kit 3 may upload the analysis result and control result to the intelligent building system 2. As a result, the computing load of the data processor 22 in the intelligent building system 2 may be balanced, and the response time of data processing may also be improved.

In some embodiments, all of the cloud management system 1, the intelligent building system 2, the intelligent building kit 3, the electronic device 41, and the positioning device 42 need to be time-synchronized for ensuring the accuracy of the intelligent control.

Figure 2A:
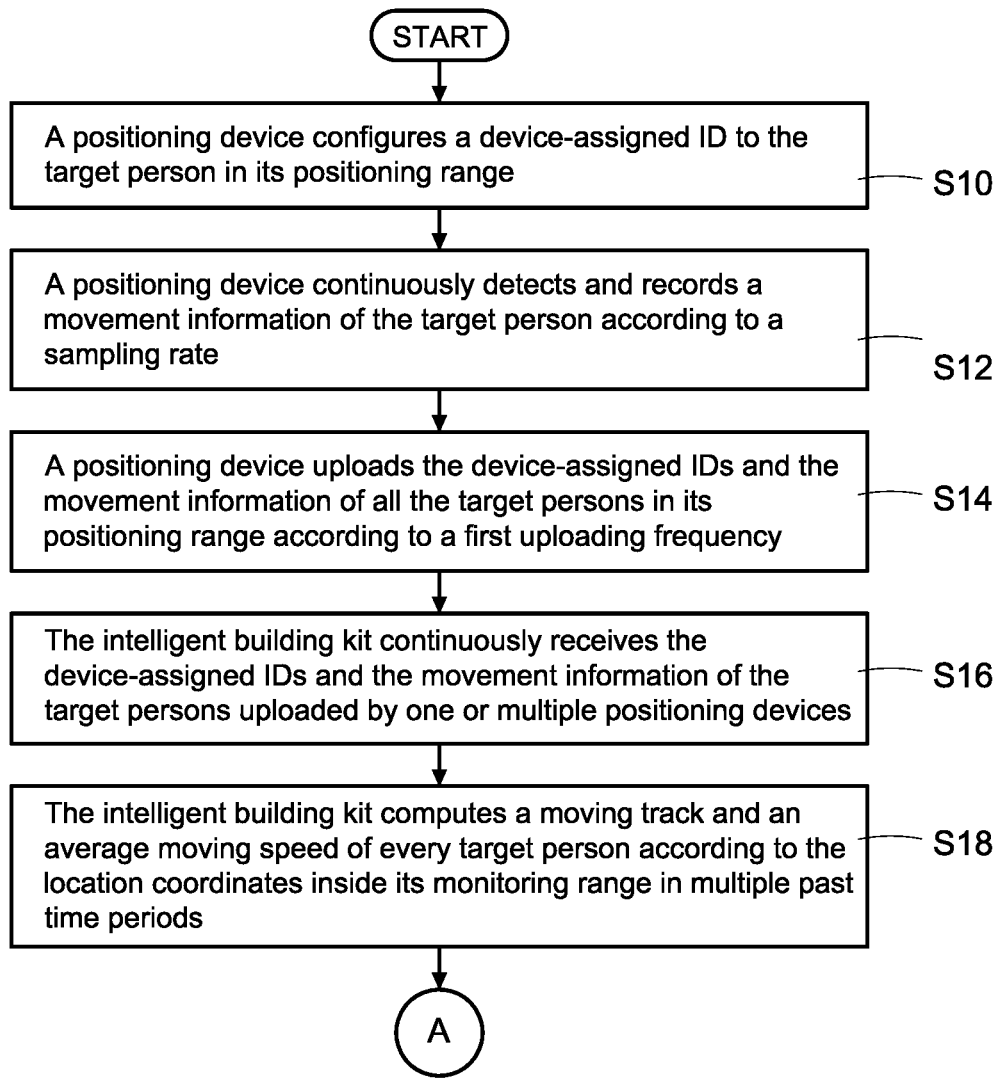
FIG. 2A is a flowchart of the first positioning and tracking in the first embodiment of this disclosure.
Figure 2B:
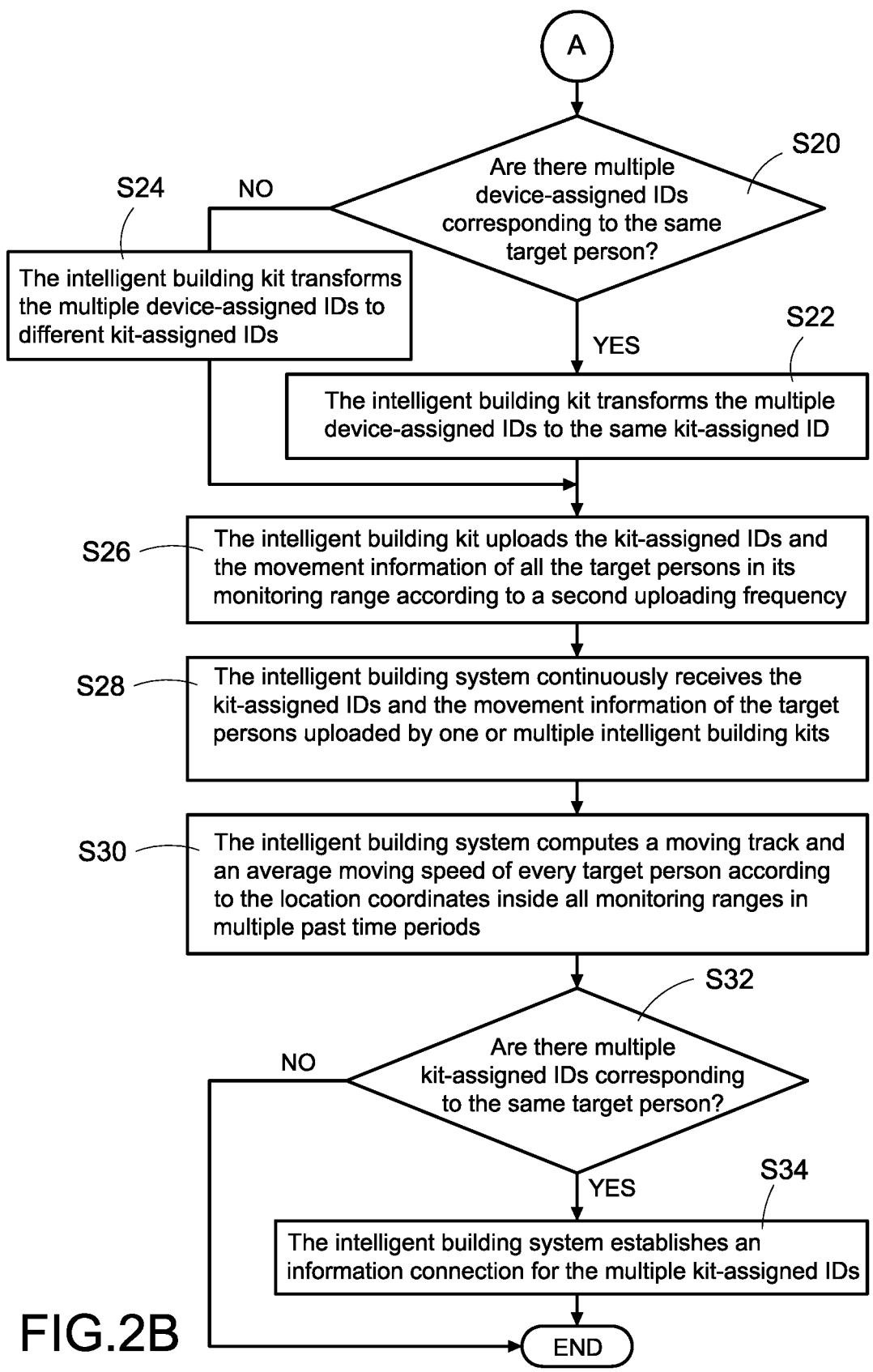
FIG. 2B is a flowchart of the second positioning and tracking in the first embodiment of this disclosure.

Refer to FIG. 2A and FIG. 2B, which are the flowcharts of the first positioning and tracking and the second positioning and tracking in the first embodiment of this disclosure. Here describes how the integrated management system of this disclosure performs positioning and tracking to the person in the building with FIG. 1, FIG. 2A, FIG. 2B, and a specific embodiment. Specifically, the integrated management system of this disclosure performs positioning and tracking to each area in the building and the person in the area. The positioning and tracking action is executed under 3D spaces, such as multi-area and multi-floor. Thus, the information being collected, stored, and used may be collectively referred to as the global 3D activity system information of the building.

One technical feature of this disclosure is that one or multiple positioning devices 42 are respectively disposed in each area inside one building, and the positioning devices 42 may position and track the target person in their positioning ranges. The intelligent building kit 3 may be configured to monitor one or multiple areas in the building as a monitoring range and receive the data uploaded by all the positioning devices 42 in the monitoring range to dynamically execute the intelligent control (for example, dynamically controlling the air-conditioning temperature and fan speed in the area according to the population and person activity level in the area) to each area in the monitoring range respectively.

The intelligent building system 2 may receive the data uploaded by the connected one or multiple intelligent building kits 3. When some areas are not being controlled by the intelligent building kit 3, the intelligent building system 2 may execute compensative control to those areas according to the data uploaded by the intelligent building kit 3. Specifically, in some embodiments, each the intelligent building kit 3 may upload the computation and control content, which is executed to all areas included in the monitoring range through the edge computation modules 31, to the intelligent building system 2 according to a preset uploading frequency. The intelligent building system 2 may execute compensative computation and control procedure for the edge computation modules 31 through the data manager 22, respectively.

The positioning device 42 is practically disposed in one area of the building when the system is established for detecting the person in its positioning range. When the appearance of at least one person (that is, the target person) in the positioning range is detected, the positioning device 42 automatically configure (or set) one and only device-assigned ID to the target person (Step S10). The positioning device 42 tracks the target person through the device-assigned ID and continuously detects and records the movement information of the target person according to a preset sampling rate (Step S12). In some embodiments, the movement information may include the location coordinate of the target person at the very time (that is, the time when the sampling occurs). In some other embodiments, if the target person leaves the positioning range of the positioning device 42 (that is, the target person leaves the area where the positioning device 42 is located) when the sampling occurs, the movement information may further include the coordinate at which the target person leaves the positioning range (described hereafter).

The positioning device 42 uploads the device-assigned IDs and movement information of one or multiple target persons in its positioning range to the intelligent building kit 3 according to a preset first uploading frequency (Step S14).

The positioning device 42 may be an image-type positioning device, a tag-type positioning device, or a non-tag-type positioning device (described hereafter). Different positioning devices have different category codes. In some embodiments, the device-assigned ID may be composed of at least one of the category code of the positioning device 42, the device number, the timestamp, and the serial number, here is not intended to be limited. In some embodiments, the intelligent building kit 3 may record the category code, and indicate and record the current positioning manner (that is, the image-type positioning, the tag-type positioning, the non-tag-type positioning, etc.) of the target person by the category code during the sampling at the time.

In some embodiments, the sampling rate of the positioning device 42 may be greater than the first uploading frequency. For example, the positioning device 42 may be configured to sample by fifteen times per second, that is, to position the same target person (that is, the same device-assigned ID) fifteen times per second and generate fifteen movement information, and be configured to upload the device-assigned IDs and movement information of all the target persons in its positioning range to the intelligent building kit 3 every three seconds. The positioning device 42 may priorly analyze and identify each target person in its positioning range based on the information obtained at the uploading interval to upload accurate movement information to the intelligent building kit 3.

As described above, the positioning device 42 may be the image-type positioning device, the tag-type positioning device, or the non-tag-type positioning device. The different positioning device is configured to adopt different positioning and tracking manner. For example, the image-type positioning device may identify the target person who appeared in the positioning range through executing the image identification procedure and track the target person through executing the object tracking algorithm after the target person is detected. The tag-type positioning device may read the tag (not shown in figures) worn by the target person when the target person appears in the positioning range to directly identify and track the target person. The non-tag-type positioning device needs to sense and calculate the first movement vector of an object in the positioning range and calculates the angle between the first movement vector and a second movement vector of the other object provided by the other non-tag-type positioning device in the overlapped positioning range, and identifies whether the two objects are the same (that is, whether the two objects are the same target person) based on the angle, and tracks the target person.

Taking the tag-type positioning device as an example, the target person may wear the wireless sensing tag, such as Wi-Fi tag, Bluetooth tag, Ultra-Wideband (UWB) tag, etc., here is not intended to be limiting. The tag may emit a signal to the multiple positioning devices 42 in their positioning ranges. The multiple positioning devices 42 may execute appropriate signal processing and algorithm in a co-work manner to compute the location of the target person.

Figure 3A:
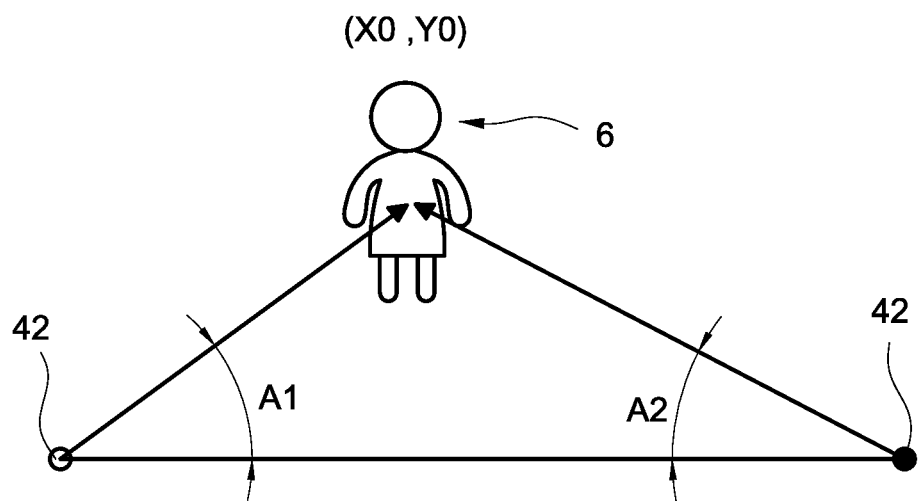
FIG. 3A is a schematic view of the positioning in the first embodiment of this disclosure.
Figure 3B:
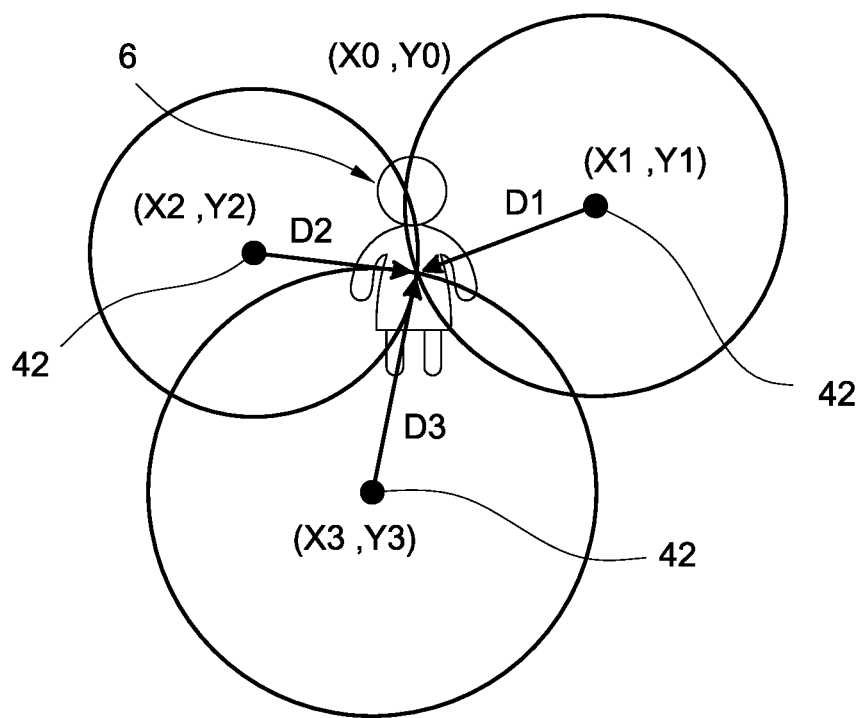
FIG. 3B is a schematic view of the positioning in the second embodiment of this disclosure.

Refer to FIG. 3A and FIG. 3B, which are the schematic views of the positioning in the first embodiment and the second embodiment of this disclosure.

FIG. 3A shows a schematic view of a positioning algorithm of the angle of arrival (AOA). As shown in FIG. 3A, a virtual positioning baseline may be defined between the multiple positioning devices 42. Each positioning device 42 calculates the angles A1, A2 between the connecting line, which is between the target person 6 and the positioning device 42, and the positioning base line, and calculates the location coordinate of the target person 6 by the angles A1, A2 and the location coordinate of each positioning device 42 itself.

In some embodiments, after the location coordinate of the target person 6 is calculated according to the angles A1, A2, each positioning device 42 uploads the movement information of the target person 6 to the intelligent building kit 3. In some other embodiments, the movement information uploaded by each positioning device 42 to the intelligent building kit 3 may include the angles A1, A2. Therefore, the intelligent building kit 3 calculates the location coordinate of the target person 6 according to the angles A1, A2 and the location coordinate of each positioning device 42. Here is not intended to be limiting.

If the positioning algorithm of AOA is adopted, only two positioning devices 42 are needed in the overlapped positioning range, and the planar location coordinate (that is, X-axis coordinate ($X_O$) and Y-axis coordinate ($Y_O$)) of the target person 6 may be calculated accurately. Further, the Z-axis coordinate of this disclosure uses the floor of the building as a reference. Therefore, the Z-axis coordinate of the target person 6 is the same as the Z-axis coordinate of the positioning device 42.

FIG. 3B shows a schematic view of a positioning algorithm of time of arrival (TOA). As shown in FIG. 3B, the multiple positioning devices 42 in the overlapped positioning range may calculate the distances D1, D2, D3 between itself and the target person 6 respectively based on the signal strength, and calculate the location coordinate of the target person 6 by the distances D1, D2, D3 and the location coordinate of each positioning device 42 itself.

In some embodiments, after the location coordinate of the target person 6 is calculated according to the distances D1, D2, D3, the positioning device 42 uploads the movement information of the target person 6 to the intelligent building kit 3. In some other embodiments, the movement information uploaded by each positioning device 42 to the intelligent building kit 3 may include the distances D1, D2, D3. Therefore, the intelligent building kit 3 calculates the location coordinate of the target person 6 according to the distances D1, D2, D3, and the location coordinate of each positioning device 42.

If the positioning algorithm of TOA is adopted, at least three positioning devices 42 are needed in the overlapped positioning range to calculate the planar location coordinate of the target person 6. Similarly, the Z-axis coordinate of the target person 6 is the same as the Z-axis coordinate of the positioning device 42.

It should be noted that all of the image-type positioning devices, the tag-type positioning device, and the non-tag-type positioning device may be configured to adopt the positioning algorithm of AOA and the positioning algorithm of TOA.

Specifically, if multiple receiving antennae are arranged in the image-type positioning device or the non-tag-type positioning device, the positioning algorithm of AOA and the positioning algorithm of TOA may be adopted to directly calculate the related information of the target person 6. On the other hand, the image-type positioning device or the non-tag-type positioning device is unable to obtain the identity of the target person 6 directly, and thereby related algorithm is required to estimate the identity to track the target person 6. For example, the positioning device 42 of the kind may calculate the angle between two movement vectors of two adjacent time periods through vector inner product and determine that the two movement vectors belong to the same target person 6 based on the assumption of rectilinear movement when the angle is less than a preset value.

The main difference between different positioning devices is that the tag-type positioning device may read the tag worn by the target person to obtain the identity of the target person directly. Thus, the reference confidence index of the information provided by the tag-type positioning device is greater than the reference confidence index of the information provided by the image-type positioning device or the non-tag-type positioning device (described hereafter).

The specific description of the positioning algorithm of AOA, the positioning algorithm of TOA, and the calculation method of vector inner product are omitted here for brevity.

Refer back to FIG. 2A, after the Step S14, the intelligent building kit 3 may continuously receive the device-assigned IDs and movement information of one or multiple target persons uploaded by the connected one or multiple positioning devices 42 respectively (Step S16). The intelligent building kit 3 calculates the moving track and average moving speed of the target person in the positioning range of the positioning device 42 according to the location coordinates of each target person in multiple past time periods (Step S18). The past time period indicates the uploading time of the positioning device 42 in the past (for example, three seconds ago, six seconds ago, etc., and so on). In the Step S18, the intelligent building kit 3 mainly obtains the location coordinates corresponding to the same device-assigned ID received several times in the past and calculates the moving track and average moving speed of the device-assigned ID (corresponding to the same target person) in the positioning range of the positioning device 42 by multiple location coordinates in different time periods.

As described above, when the target person moves in the positioning range of the positioning device 42 and leaves the positioning range, the positioning device 42 may simultaneously record the coordinate at which the target person leaves the positioning range. As shown in FIG. 2B, after the Step S18, the intelligent building kit 3 may determine whether the multiple device-assigned IDs uploaded by the multiple adjacent positioning devices 42 respectively are corresponding to the same target person according to the coordinates when the multiple device-assigned IDs leave the positioning range, the moving track, and the average moving speed (Step S20).

In some embodiments, if the intelligent building kit 3 analyzes and determines that the multiple device-assigned IDs are corresponding to the same target person, the intelligent building kit 3 transforms the multiple device-assigned IDs to one kit-assigned ID (Step S22). If the intelligent building kit 3 analyzes and determines that the multiple device-assigned IDs are corresponding to different target persons, the intelligent building kit 3 transforms the multiple device-assigned IDs to different kit-assigned IDs (Step S24).

For example, the first target person is positioned and tracked by the first positioning device in the first positioning range, which is in the first area of the second floor of the building, and the first positioning device is an image-type positioning device disposed in the first area of the second floor of the building. The first positioning device configures the first device-assigned ID as "Video_2F_1_0001" for the first target person. When the first target person leaves the first positioning range and enters the adjacent second positioning range to be positioned and tracked by the second positioning device, which is the tag-type positioning device disposed in the second area adjacent to the first area, and the second positioning device configures the second device-assigned ID as "Video 2F_2_0001" for the first target person.

In some embodiments, the intelligent building kit 3 may analyze and obtain that the moving track of the first device-assigned ID is moving from the first area toward the second area and the moving track of the second device-assigned ID is entering the second area from the first area, and further determine that the time and location where the first device-assigned ID leaves the first positioning range is consistent with the time and location where the second device-assigned ID appears in the second positioning range according to the average moving speed of the first device-assigned ID, the coordinate where the first device-assigned ID leaves the first positioning range, and the average moving speed and the positioning coordinate of the second device-assigned ID.

In summary, the intelligent building kit 3 may determine the first device-assigned ID and the second device-assigned ID are corresponding to the same target person and transform the first device-assigned ID and the second device-assigned ID to the same kit-assigned ID. In some embodiments, the intelligent building kit 3 may be the air-conditioning kit used to control the air-conditionings in all areas of the second floor of the building. Thus, the intelligent building kit 3 may configure the kit-assigned ID as "HVAC_2F_0001" for the target person. In some other embodiments, the intelligent building kit 3 may be the energy kit used to control the other electronic equipment in the east area of the second floor of the building. Thus, the intelligent building kit 3 may configure the kit-assigned ID as "ENERGY 2F_EAST_0001" for the target person. Here is not intended to be limiting.

Refer back to FIG. 2B, after the Step S22 or the Step S24, the intelligent building kit 3 may upload the kit-assigned IDs and movement information of one or multiple target persons in all areas of the monitoring range to the intelligent building system 2 according to the preset second uploading frequency (Step S26).

After the Step S26, the intelligent building system 2 continuously receives the kit-assigned IDs and movement information of one or multiple target persons, respectively uploaded by the connected one or multiple intelligent building kits 3 (Step S28). Similarly, the intelligent building system 2 may calculate the moving track and average moving speed of the target person in the monitoring range of each intelligent building kit 3 according to the location coordinates of each target person in multiple past time periods (Step S30). The past time period indicates the uploading time of the intelligent building kit 3 in the past (for example, three seconds ago, six seconds ago, etc., depending on the second uploading frequency).

In the Step S30, the intelligent building system 2 mainly obtains the location coordinate of each kit-assigned ID received several times in the past and calculates the moving track and average moving speed of each kit-assigned ID (corresponding to different target person) in the monitoring range (including one or multiple areas) of each intelligent building kit 3 by the location coordinates in different time periods.

As described above, when the target person leaves the positioning range of one positioning device 42, the positioning device 42 records the coordinate at which the target person leaves the positioning range. When the target person leaves the monitoring range of one intelligent building kit 3, the intelligent building kit 3 records the coordinate at which the target person leaves the monitoring range and the current time period.

After the Step S30, the intelligent building system 2 may determine whether the multiple kit-assigned IDs respectively uploaded by multiple adjacent intelligent building kits 3 (referring to monitoring ranges adjacent to each other) are corresponding to the same target person according to the coordinates (when the multiple kit-assigned IDs leave the monitoring range), and the moving tracks and average moving speeds of the multiple kit-assigned IDs (Step S32).

In some embodiments, if the intelligent building system 2 analyzes and determines that the multiple kit-assigned IDs are corresponding to the same target person, the intelligent building system 2 establishes the information connection of the multiple kit-assigned IDs (Step S34) to facilitate the monitoring or analysis for the target person in the subsequence. If the intelligent building system 2 analyzes and determines that the multiple kit-assigned IDs are corresponding to different target persons, the intelligent building system 2 may record the kit-assigned IDs respectively to monitor and analyze the target persons respectively without generating the additional ID.

The integrated management system of this disclosure positions and tracks all target persons inside the building through the positioning device 42, the intelligent building kit 3, and the intelligent building system 2 for the purpose of analyzing the status of the persons (including population, density, activity level, etc.) in each area of the building, thereby appropriately controlling each area.

It should be noted that the intelligent building kit 3 may execute all the aforementioned procedures through the internal edge computation module 31, and the intelligent building system 2 may execute all the aforementioned procedures through the internal data processor 22. Here is not intended to be limiting.

Figure 4:
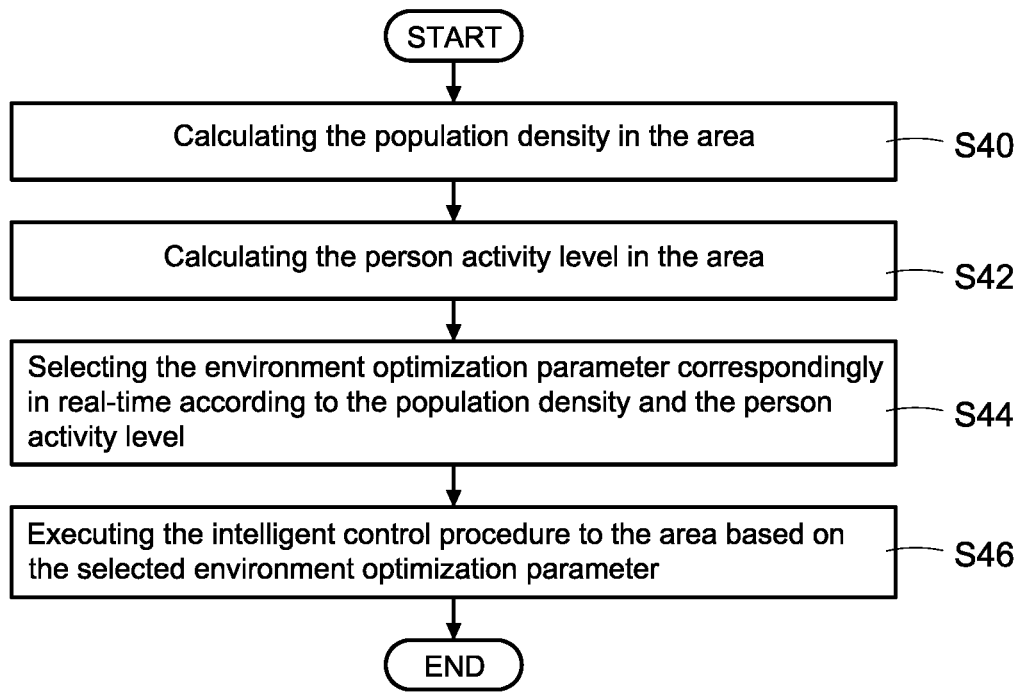
FIG. 4 is a flowchart of the intelligent control in the first embodiment of this disclosure.

Refer to FIG. 4, which is a flowchart of the intelligent control in the first embodiment of this disclosure. As described above, the intelligent building kit 3 has the edge computation module 31. According to the embodiment in FIG. 2A and FIG. 2B, after the device-assigned IDs and movement information uploaded by the connected one or multiple positioning devices 42 are continuously received, the intelligent building kit 3 may calculate the population density (Step S40) and the person activity level (Step S42) of one or multiple areas in the monitoring range through the edge computation module 31. The edge computation module 31 selects the environment optimization parameter correspondingly in real-time according to the population density and the person activity level of each area in the monitoring range (Step S44), and performs the intelligent control procedure for each area based on the environment optimization parameter being selected (Step S46).

In some embodiments, the environment optimization parameter may be the air-conditioning temperature and the fan speed, and the intelligent control procedure may be the automatic control procedure of the air-conditioning. In some other embodiments, the environment optimization parameter may be the lighting intensity, and the intelligent control procedure may be the automatic control procedure of the lighting. Here is not intended to be limiting.

In some embodiments, each intelligent building kit 3 may select the environment optimization parameter and execute the intelligent control procedure through the edge computation module 31. In the Step S26 of FIG. 2B, each intelligent building kit 3 uploads all contents of the calculation and control procedure, which are executed by the edge computation module 31 to all areas of the monitoring range, to the intelligent building system 2 according to the second uploading frequency. With respect to the area which is not processed by the intelligent building kit 3, after the aforementioned data are received, the intelligent building system 2 may execute compensative computation and control procedure for the corresponding edge computation module 31 through the data manager 22. In other words, the intelligent control may be performed to each area of the building by each intelligent building kit 3, or by the intelligent building system 2 on the highest layer of the hierarchy.

It should be noted that when the intelligent building system 2 receives all the global 3D activity system information of the building uploaded by each intelligent building kit 3 through the data processor 22, apart from updating the real-time information of each target person and each area in the building (for example, storing to the real-time database of the data manager 24), the intelligent building system 2 may store all the global 3D activity system information of the building of each target person and each area in the previous time period (for example, storing to the historical database of the data manager 24) for subsequent analysis.

Figure 5:
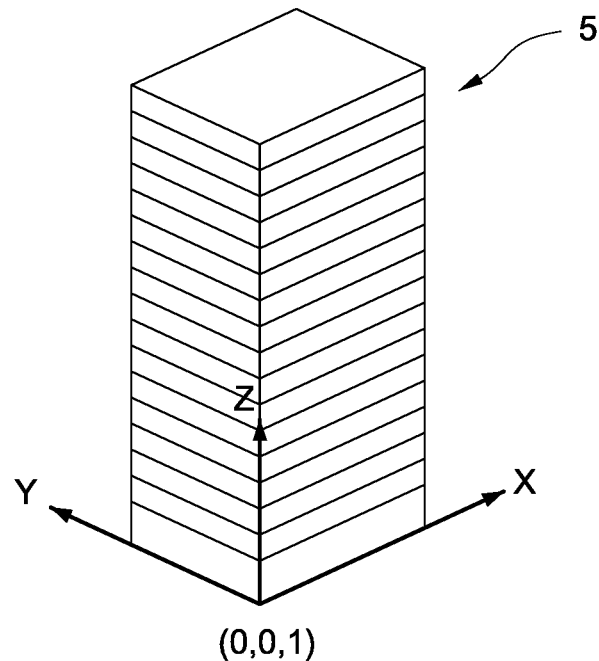
FIG. 5 is a schematic view of the 3D coordinate system in the first embodiment of this disclosure.
Figure 6:
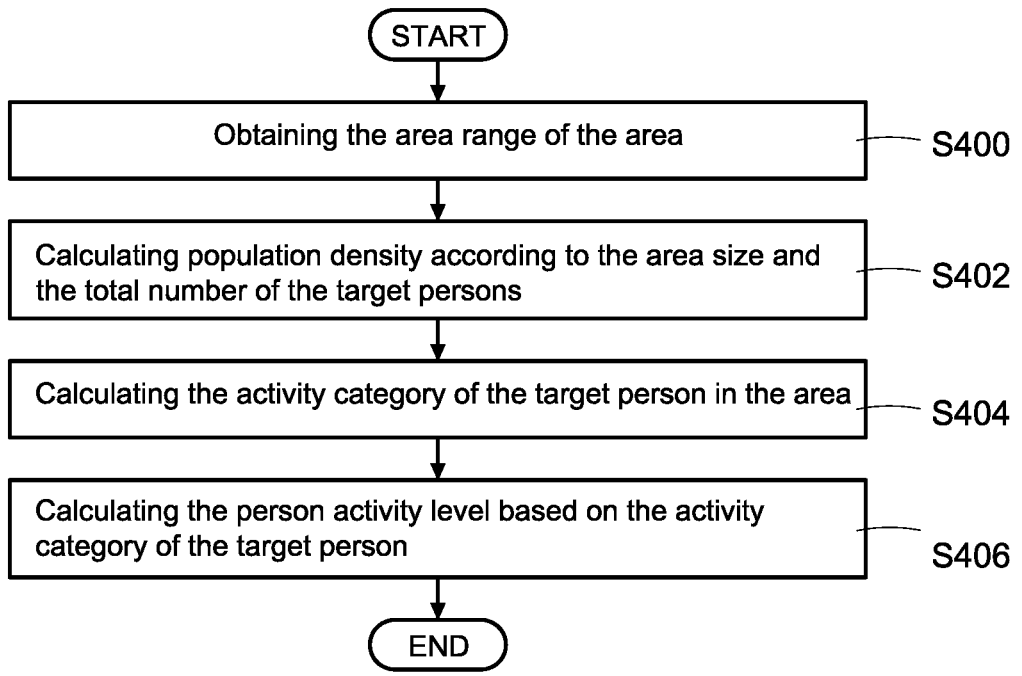
FIG. 6 is a flowchart of the parameter calculation in the first embodiment of this disclosure.

Refer to FIG. 5 and FIG. 6, FIG. 5 is a schematic view of the 3D coordinate system in the first embodiment of this disclosure, and FIG. 6 is a flowchart of the parameter calculation in the first embodiment of this disclosure.

As shown in FIG. 5, the technical feature of this disclosure is that a virtual 3D coordinate system may be preset for the entire building. The virtual 3D coordinate system may set one corner on the first floor of building 5 as the origin (the origin in the embodiment is (0,0,1)), set the direction toward the east as the X-axis, set the direction toward the north as the Y-axis, and set the floor direction as the Z-axis. The manager may configure the variation units (for example, one unit per twenty centimeters) of the X-axis and Y-axis and the variation unit (for example, one unit per one floor) of the Z-axis.

By establishing the virtual 3D coordinate system, when the manager practically installs the positioning device 42, the locating coordinate of each positioning device 42 relative to the entire building may be configured directly. As a result, when each positioning device 42 detects the target person, the location coordinate of the target person in the virtual 3D coordinate system may be effectively calculated. Therefore, the edge computation module 31 or the data processor 22 may position and track one or multiple target persons 6 in the building 5 by the location coordinates.

FIG. 6 further shows the calculating method of the population density and person activity level in the area. Here uses the edge computation module 31 of the intelligent building kit 3 as an example for executing the calculation, and the technical features are similar for the embodiment of the data processor 22 of the intelligent building system 2 executing the calculation, which is omitted for brevity.

Specifically, the intelligent building kit 3 obtains the area size of the area to be calculated (Step S400), and then the edge computation module 31 calculates the total number of the target persons 6 in the area based on the information uploaded by all the positioning devices 42 in the area and calculates the population density of the area according to the area size and the total number of the target persons 6 (Step S402).

Figure 7:
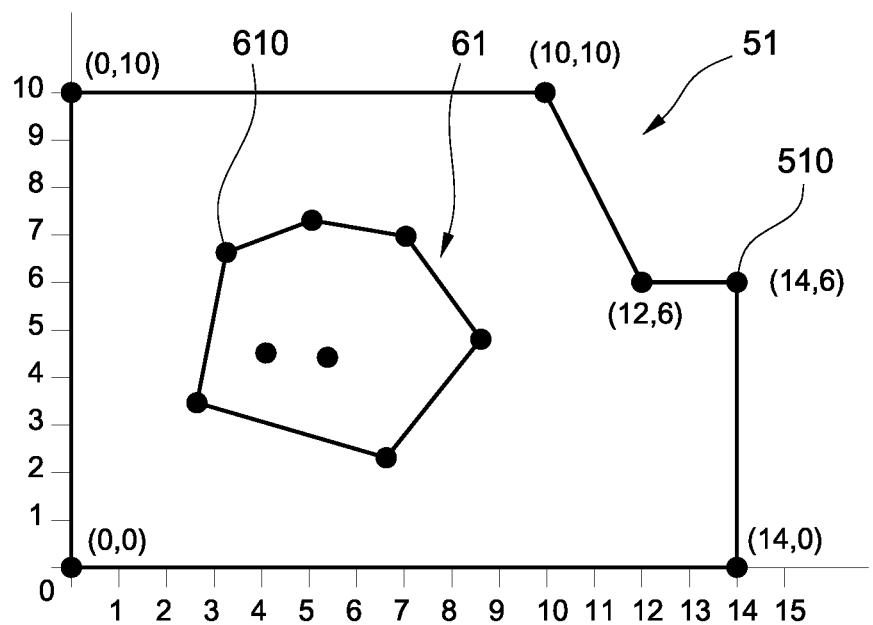
FIG. 7 is a schematic view of the area percentage in the first embodiment of this disclosure.

In some embodiments, the intelligent building kit 3 may confirm the area to be calculated in the Step S400 priorly, determine the area range according to multiple vertex coordinates of the preset area frame of the area in the virtual 3D coordinate system (as shown in FIG. 7), and calculate the area size correspondingly.

The edge computation module 31 further calculates the activity category of each target person 6 in the area based on the movement information uploaded by all the positioning devices 42 in the area (Step S420) and calculates the person activity level of the area based on the activity category of each target person 6 (Step S422). In some embodiments, the activity category may be categorized by heavy activity (such as running, jumping, etc.), medium activity (such as fast walking, jogging, etc.), mild activity (such as walking, roaming, etc.), and minor activity (such as sleeping, meditating, etc.), here is not intended to be limiting.

In some embodiments, the intelligent building kit 3 may calculate the moving speed standard deviation of the target person 6 according to the location coordinates of the same target person 6 in multiple past time periods. Thus, the edge computation module 31 may execute the deep learning algorithm according to the moving track, average moving speed, and moving speed standard deviation of the target person 6 to identify the activity category of the target person 6.

For example, if the first target person has consistent direction in the moving track, medium average moving speed, and minor moving speed standard deviation in the first area, the edge computation module 31 may calculate and determine the activity category of the first target person to be "walking." For another example, if the second target person has back-and-forth direction in the moving track, low average moving speed, and minor moving speed standard deviation in the second area, the edge computation module 31 may calculate and determine the activity category of the second target person to be "roaming."

In some embodiments, the integrated management system of this disclosure may configure activity grade correspondingly to different activity categories through the preset configuration of the manager. For example, the activity grade of heavy activity is 81~100, the activity grade of medium activity is 51~80, the activity grade of mild activity is 21~50, and the activity grade of minor activity is 0~20. In some embodiments, the edge computation module 31 may add up the activity grades of all the target persons 6 in the area and divide that by the total number of the target persons 6 to obtain the average activity grade of the target persons 6 in the area, and calculate the person activity level of the area according to the average activity grade.

For example, the integrated management system may divide the person activity level into three levels as strong, normal, and moderate through the configuration of the manager. If the edge computation module 31 calculates the average activity grade in the area to be 71~100, the person activity level of the area may be determined as the strong level. If the average activity grade is 31~70, the person activity level of the area may be determined as the normal level. If the average activity grade is 0~30, the person activity level of the area may be determined as the moderate level.

In some embodiments, the content of the environment optimization parameter is mainly proportional to the population density and the person activity level. Taking the environment optimization parameter for the air-conditioning temperature and fan speed as an example, if the population density is high, the air-conditioning temperature is set to be lower, and the fan speed is set to be higher; if the population density is low, the air-conditioning temperature is set to be higher, and the fan speed is set to be lower. If the person activity level is strong, the air-conditioning temperature is set to be lower, and the fan speed is set to be higher; if the person activity level is normal, the air-conditioning temperature and the fan speed are set to be standard; if the person activity level is moderate, the air-conditioning temperature is set to be higher, and the fan speed is set to be lower. Here is not intended to be limiting.

In some embodiments, the edge computation module 31 of the intelligent building kit 3 mainly selects the appropriate environment optimization parameter according to the population density and person activity level in each area. In some other embodiments, the edge computation module 31 may further identify the persons-occupied area percentage of each area and select the appropriate environment optimization parameter according to the population density, person activity level, and persons-occupied area percentage in each area.

Refer to FIG. 7, which is a schematic view of the persons-occupied area percentage in the first embodiment of this disclosure. As shown in FIG. 7, when the persons-occupied area percentage in the area needs to be calculated, the edge computation module 31 may obtain the multiple vertex coordinates 510 of the preset area frame of the area in the virtual 3D coordinate system, determine the area range 51 of the area by the vertex coordinates 510, and calculate the area size of the area range 51.

Then, the edge computation module 31 obtains the location coordinates 610 of all the target persons 6 in the area at the very time and determines a person-presence range 61 according to the location coordinates 610. In some embodiments, the person-presence range 61 indicates the range constituted by the maximal frame, of which the location coordinates 610 may be composed. The edge computation module 31 calculates the person-presence area size of the person-presence range 61. In the end, the edge computation module 31 calculates the persons-occupied area percentage according to the area size and person-presence area size. The persons-occupied area percentage is the percentage for the ratio of the person-presence area size to the area size.

In some embodiments, the integrated management system may divide the persons-occupied area percentage into three levels as dense, moderate, and loose through the configuration of the manager. If the edge computation module 31 calculates the persons-occupied area percentage of the area to be 71%~100%, the persons-occupied area percentage of the area may be determined to be dense level; if the persons-occupied area percentage of the area is 31%~70%, the persons-occupied area percentage of the area may be determined to be moderate level; if the persons-occupied area percentage of the area is 0%~30%, the persons-occupied area percentage of the area may be determined to be loose level.

In some embodiments, the content of the environment optimization parameter is mainly proportional to the persons-occupied area percentage. Taking the environment optimization parameter for the air-conditioning temperature and fan speed as an example, if the persons-occupied area percentage is dense level, the air-conditioning temperature is set to be lower, and the fan speed is set to be higher; if the persons-occupied area percentage is moderate level, the air-conditioning temperature and fan speed are set to be standard; if the persons-occupied area percentage is loose level, the air-conditioning temperature is set to be higher, and the fan speed is set to be lower. Here is not intended to be limiting.

In some embodiments, the edge computation module 31 in the intelligent building kit 3 mainly selects the appropriate environment optimization parameter according to the population density, person activity level, and persons-occupied area percentage in each area. As described above, the accuracy of the movement information provided and detected by different positioning devices 42 may be different, thereby in some embodiments, the edge computation module 31 may further identify the area reference confidence index of each area and select the appropriate environment optimization parameter based on the population density, person activity level, persons-occupied area percentage, and area reference confidence index of each area.

It should be noted that the edge computation module 31 and the data processor 22 may selectively refer to any one of the persons-occupied area percentage and area reference confidence index to enhance the calculation of the environment optimization parameter. Here is not intended to be limiting.

Figure 8:
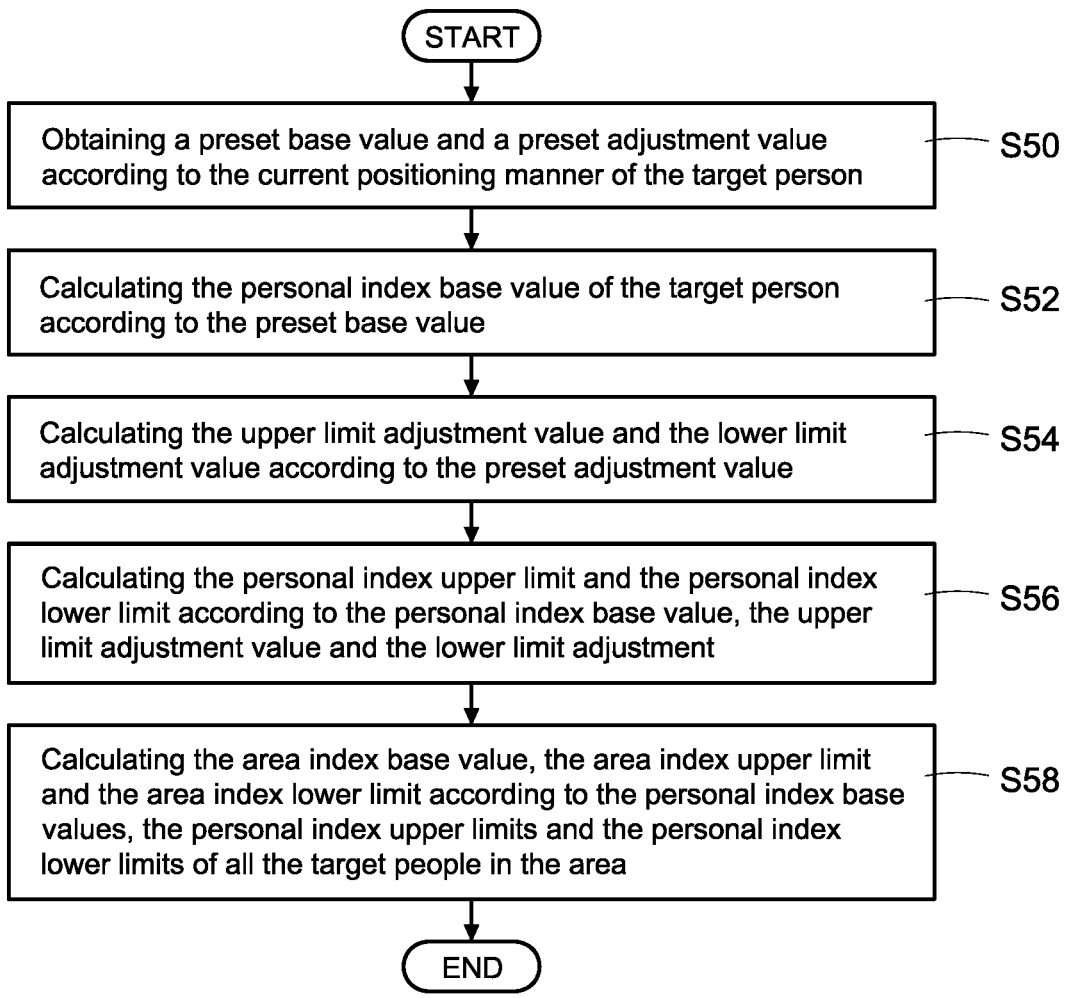
FIG. 8 is a flowchart of the parameter calculation in the second embodiment of this disclosure.

Refer to FIG. 8, which is a flowchart of the parameter calculation in the second embodiment of this disclosure. In some embodiments, the area reference confidence index indicates the reliable level of the information related to the area. In some embodiments, the edge computation module 31 mainly calculates the area reference confidence index of the area according to the personal reference confidence index of all the target persons 6 in the area.

Specifically, the area reference confidence index includes an area index base value, an area index upper limit, and an area index lower limit, and the personal reference confidence index includes a personal index base value, a personal index upper limit, and a personal index lower limit. In some embodiments, the edge computation module 31 calculates the area index base value, area index upper limit, and area index lower limit of the area according to the personal index base values, personal index upper limits, and personal index lower limits of all the target persons 6 in the area, respectively (described hereafter).

As shown in FIG. 8, the edge computation module 31 obtains the current positioning manner of each target person 6 in the area (for example, obtaining the category code in the device-assigned ID of the target person 6) and obtains the preset base value and preset adjustment value correspondingly according to the current positioning manner (Step S50). In some embodiments, the preset base value may be a positive number between 0 and 1, and different positioning manners may be corresponding to different preset base values. For example, the accuracy of the tag-type positioning device is higher, and thereby the preset base value may be configured to be 0.9; the accuracy of the image-type positioning device is lower than the tag-type positioning device, thereby the preset base value may be configured to be 0.8; the accuracy of the non-tag-type positioning device is the lowest, thereby the preset base value may be configured to be 0.7.

In some embodiments, the preset adjustment value may be configured to be 0.1. For example, when the edge computation module 31 obtains the first movement information from the image-type positioning device, the preset base value and preset adjustment value do not need to be adjusted. In that condition, the edge computation module 31 may take the preset base value as the personal index base value and subtract the preset adjustment value from the personal index base value to obtain the personal index lower limit (that is, 0.8−0.1=0.7), and add up the personal index base value and preset adjustment value to obtain the personal index upper limit (that is, 0.8+0.1=0.9).

When the second movement information of the same target person 6 is received, the edge computation module 31 needs to adjust the preset base value and preset adjustment value to update the personal index base value, personal index lower limit, and personal index upper limit.

As shown in FIG. 8, after the Step S50, the edge computation module 31 calculates the personal index base value of the target person 6 at the very time according to the preset base value (Step S52), calculates the upper limit adjustment value and lower limit adjustment value according to the preset adjustment value (Step S54), and calculates the personal index upper limit and personal index lower limit of the target person 6 at the very time according to the calculated personal index base value, upper limit adjustment value, and lower limit adjustment value (Step S56).

After the personal index base values, personal index upper limits, and personal index lower limits of all the target persons 6 in the area are calculated through the Step S50 to the Step S56, the edge computation module 31 may further calculate the area index base value, area index upper limit, and area index lower limit of the area according to the personal index base values, personal index upper limits, and personal index lower limits (Step S58).

In some embodiments, the edge computation module 31 calculates the average value of the personal index base values of all the target persons 6 in the area and takes the average value as the area index base value of the area. In some embodiments, the edge computation module 31 obtains the maximal value of the personal index upper limits of all the target persons 6 in the area and takes the maximal value as the area index upper limit of the area. In some embodiments, the edge computation module 31 obtains the minimal value of the personal index lower limits of all the target persons 6 in the area and takes the minimum value as the area index lower limit of the area.

In some embodiments, the edge computation module 31 may respectively select different environment optimization parameters when the area index base value is in a range close to the area index upper limit, when the area index base value is in a range close to the area index lower limit, and when the area index base value is between the area index upper limit and the area index lower limit. Taking the environment optimization parameter for the air-conditioning temperature and fan speed as an example, the edge computation module 31 may adopt higher air-conditioning temperature and lower fan speed when the area index base value is in a range close to the area index upper limit, adopt lower air-conditioning temperature and higher fan speed when the area index base value is in a range close to the area index lower limit, and adopt standard air-conditioning temperature and standard fan speed when the area index base value is between the area index upper limit and the area index lower limit. Here is not intended to be limiting.

If the environment optimization parameter is selected by simultaneously referring to the population density, person activity level, persons-occupied area percentage, and area reference confidence index, and the air-conditioning temperature and fan speed is used as an example for the environment optimization parameter, and the calculation result of the edge computation module 31 and data processor 22 may be shown as the following table.

| No | population density | person activity level | persons-occupied area percentage | area reference confidence index | Air-conditioning optimization |
|---|---|---|---|---|---|
| 1 | Dense | Strong | Dense | Base value is close to lower limit | Temperature 23 Fan speed 100 |
| 2 | | | | Base value is close to lower limit | Temperature 23.5 Fan speed 90 |
| 3 | | | | Base value is close to upper limit | Temperature 24 Fan speed 80 |
| 4 | | | Moderate | Base value is close to lower limit | Temperature 23.5 Fan speed 90 |
| 5 | | | | Base value is in middle | Temperature 24 Fan speed 80 |
| 6 | | | | Base value is close to upper limit | Temperature 24.5 Fan speed 70 |
| 7 | | | Loose | Base value is close to lower limit | Temperature 24 Fan speed 80 |
| 8 | | | | Base value is in middle | Temperature 24.5 Fan speed 70 |
| 9 | | | | Base value is close to upper limit | Temperature 25 Fan speed 70 |
| 10 | | Normal | Dense | Base value is close to lower limit | Temperature 25 Fan speed 90 |
| 11 | | | | Base value is in middle | Temperature 25.5 Fan speed 80 |
| 12 | | | | Base value is close to upper limit | Temperature 26 Fan speed 70 |
| 13 | | | Moderate | Base value is close to lower limit | Temperature 25.5 Fan speed 80 |
| 14 | | | | Base value is in middle | Temperature 26 Fan speed 70 |
| 15 | | | | Base value is close to upper limit | Temperature 26.5 Fan speed 70 |
| 16 | | | Loose | Base value is close to lower limit | Temperature 26 Fan speed 70 |
| 17 | | | | Base value is in middle | Temperature 26.5 Fan speed 70 |
| 18 | | | | Base value is close to upper limit | Temperature 26.5 Fan speed 70 |
| 19 | | Moderate | Dense | Base value is close to lower limit | Temperature 26.5 Fan speed 80 |
| 20 | | | | Base value is in middle | Temperature 26.5 Fan speed 70 |
| 21 | | | | Base value is close to upper limit | Temperature 26.5 Fan speed 70 |
| 22 | | | Moderate | Base value is close to lower limit | Temperature 26.5 Fan speed 70 |
| 23 | | | | Base value is in middle | Temperature2 6.5 Fan speed 70 |
| 24 | | | | Base value is close to upper limit | Temperature 26.5 Fan speed 70 |
| 25 | | | Loose | Base value is close to lower limit | Temperature 26.5 Fan speed 70 |
| 26 | | | | Base value is in middle | Temperature 26.5 Fan speed 70 |
| 27 | | | | Base value is close to upper limit | Temperature 26.5 Fan speed 70 |

Refer back to FIG. 8, in the Step S52, the edge computation module 31 mainly calculates the difference value between the preset base value in the previous time period (corresponding to the positioning manner in the previous time period) and the preset base value in the current time (corresponding to the positioning manner in the very time) of the target person 6, and calculates the personal index base value of the target person 6 in the current time period with a product of the difference value and the personal index base value in the previous time period. It should be noted that when the edge computation module 31 calculates the personal index base value of the target person 6 for the first time, the personal index base value is equal to the preset base value.

Specifically, in the Step S52, the edge computation module 31 may use the first formula as follows to calculate the personal index base value of the target person 6 in the current time period. The first formula is that:

$$\text{Base\_Index}_t = \text{Base\_Index}_{t-1} \times (1 + (\text{Default\_Base\_Index}_t - \text{Default\_Base\_Index}_{t-1})) \quad (1)$$

The Base Index$_t$ is the personal index base value in the current time period. The Base Index$_{t-1}$ is the personal index base value in the previous time period.

In the Step S54, the edge computation module 31 calculates the upper limit adjustment value and lower limit adjustment value according to the preset adjustment value, moving direction predicted deviation, and a preset adjustment unit of the target person 6. It should be noted that when the edge computation module 31 calculates the personal index base value of the target person 6 for the first time, the upper limit adjustment value and lower limit adjustment value are equal to the preset adjustment value.

Specifically, in the Step S54, the edge computation module 31 uses the second formula and third formula as follows to respectively calculate the upper limit adjustment value and lower limit adjustment value. The second formula is that:

$$U\text{Val}_{adj} = \text{Val}_{Default} + (\text{Level}_{Default} - \text{Level}_{Adj}) \times \text{Unit}_{Adj} \quad (2)$$

The third formula is that:

$$D\text{Val}_{adj} = \text{Val}_{Default} - (\text{Level}_{Default} - \text{Level}_{Adj}) \times \text{Unit}_{Adj} \quad (3)$$

The $U\text{Val}_{adj}$ is the upper limit adjustment value. The $D\text{Val}_{adj}$ is the lower limit adjustment value. The $\text{Val}_{Default}$ is the preset adjustment value. The $\text{Level}_{Default}$ is the preset deviation level. The $\text{Level}_{Adj}$ is the deviation level of the moving direction predicted deviation. The $\text{Unit}_{Adj}$ is the preset adjustment unit.

In the Step S56, the edge computation module 31 adds up the preset base value of the target person 6 in the current time period and the calculated upper limit adjustment value to generate the personal index upper limit in the current time period. Also, the edge computation module 31 adds up the preset base value of the target person 6 in the current time period and the calculated lower limit adjustment value to generate the personal index lower limit in the current time period.

As described above, the edge computation module 31 calculates the upper limit adjustment value and lower limit adjustment value based on the preset adjustment value and moving direction predicted deviation of the target person 6. The moving direction predicted deviation is described as follows.

Figure 9:
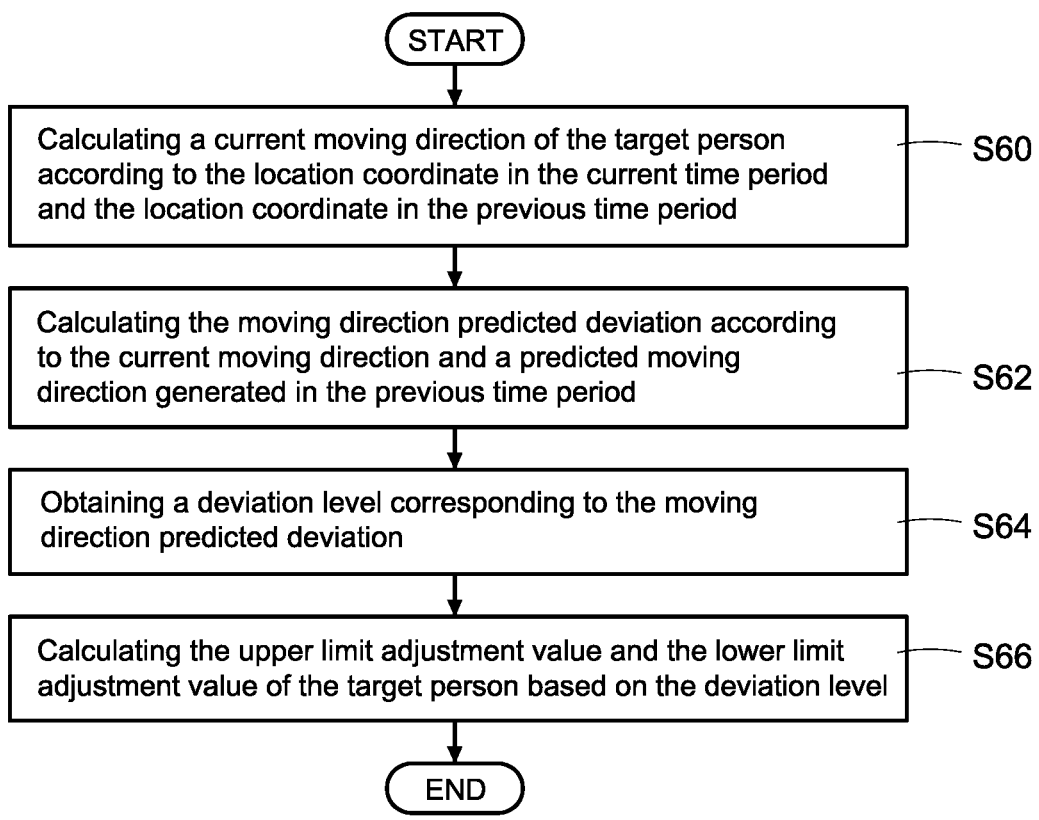
FIG. 9 is a flowchart of the parameter calculation in the third embodiment of this disclosure.

Refer to FIG. 9, which is a flowchart of the parameter calculation in the third embodiment of this disclosure. As shown in FIG. 9, for calculating the upper limit adjustment value and lower limit adjustment value, the edge computation module 31 calculates the current moving direction of the target person 6 according to the location coordinate in the current time period and the location coordinate in the previous time period (Step S60) in advance.

In some embodiments, the edge computation module 31 may predict the moving direction of the target person 6 in the next time period (hereafter referred to as the predicted moving direction) according to the location coordinate of the target person 6 in the current time period, and the location coordinates in the multiple past time periods. In some embodiments, the edge computation module 31 may calculate a moving direction predicted deviation according to the current moving direction of the target person 6 and the predicted moving direction generated in the previous time period (Step S62), and obtain a deviation level correspondingly based on the moving direction predicted deviation (Step S64). In the end, the edge computation module 31 may calculate the upper limit adjustment value and lower limit adjustment value of the target person 6 based on the calculated deviation level (Step S66).

In some embodiments, the current moving direction and predicted moving direction respectively include a vector length. The vector length indicates the moving distance of the target person 6 between two uploading actions. In the Step S62, the edge computation module 31 calculates the vector angle between the current moving direction and predicted moving direction generated in the previous time period and takes the vector angle as the moving direction predicted deviation. In the Step S64, the edge computation module 31 obtains the deviation level correspondingly according to the vector angle. The deviation level is directly proportional to the vector angle.

For example, the integrated management system of this disclosure may configure, by the manager, the vector angle at 0 degree as the zeroth level of the deviation level (that is, no deviation), the vector angle greater than 0 degree and less than 10 degrees as the first level of the deviation level (that is, the deviation is extremely small), the vector angle equal to or greater than 10 degrees and less than 20 degrees as the second level of the deviation level, the vector angle equal to or greater than 20 degrees and less than 30 degrees as the third level of the deviation level, the vector angle equal to or greater than 30 degrees and less than 45 degrees as the fourth level of the deviation level, and the vector angle equal to or greater than 45 degrees as the fifth level of the deviation level (that is, the deviation is extremely large).

In some embodiments, the edge computation module 31 may configure the second level of the deviation level as the preset deviation level and configure the adjustment unit as 0.02 through configuration, and execute the second formula and third formula accordingly to calculate the upper limit adjustment value and lower limit adjustment value. Taking the preset base value to be 0.8, the preset adjustment value to be 0.1, the adjustment unit to be 0.02 for example, the upper limit adjustment value, lower limit adjustment value, personal index upper limit (abbreviated as the upper limit in the table below), and personal index lower limit (abbreviated as the lower limit in the table below) may be calculated as shown in the table below. Here is not intended to be limiting.

|  | Deviation level | | | | | |
| --- | --- | --- | --- | --- | --- | --- |
|  | 0 | 1 | 2 | 3 | 4 | 5 |
| Preset base value | 0.8 | 0.8 | 0.8 | 0.8 | 0.8 | 0.8 |
| Lower limit adjustment value | 0.06 | 0.08 | 0.1 | 0.12 | 0.14 | 0.16 |
| Low limit | 0.74 | 0.72 | 0.7 | 0.68 | 0.66 | 0.64 |

-continued

|  | Deviation level | | | | | |
| --- | --- | --- | --- | --- | --- | --- |
|  | 0 | 1 | 2 | 3 | 4 | 5 |
| Upper limit adjustment value | 0.14 | 0.12 | 0.1 | 0.08 | 0.06 | 0.04 |
| Upper limit | 0.94 | 0.92 | 0.9 | 0.88 | 0.86 | 0.84 |

As described above, the personal reference confidence index and area reference confidence index of this disclosure indicate the reliable level of the information related to each target person and the located area. Apart from the base value, the reference confidence index (including the personal reference confidence index and area reference confidence index) further includes the upper limit and lower limit for the purpose of giving the reference confidence index more application flexibility. Taking above table as an example, the base value refers to the accuracy of the positioning device 42, and the upper limit and lower limit refer to the moving direction predicted deviation.

For example, the base values in the above table are all 0.8 (that is, the preset base value), when the deviation level is zero, the upper limit is 0.94 and the lower limit is 0.74, and the base value is closer to the lower limit. That indicates that the referable level is greater than 0.8 because the moving direction prediction is accurate, and the reliable level is increased. When the deviation level is five, the upper limit is 0.84, and the lower limit is 0.64, and the base value is closer to the upper limit. That indicates that the referable level is much less than 0.8 because the moving direction predicted deviation is extremely large, and the reliable level is decreased.

As described above, the edge computation module 31 may calculate the deviation level according to the current moving direction of the target person 6 and the predicted moving direction in the previous time period. The edge computation module 31 calculates the predicted moving direction in the next time period according to the current moving directions of the target person 6 in the multiple past time periods. Specifically, the current moving direction in each past time period includes an attempt weight correspondingly. The attempt weight corresponding to the past time period closest to the current time period is the greatest, and a sum of the attempt weights of all the past time periods is one. In some embodiments, the edge computation module 31 calculates a sum of the product of the current moving direction in the multiple past time periods and each corresponding attempt weight for the predicted moving direction.

In some embodiments, the edge computation module 31 may use the fourth formula as follows according to the current moving directions in the multiple past time periods to calculate the predicted moving direction in the next time period. The fourth formula is that:

$$V_{N+1} = \sum_{i=1}^{N} V_i \times W_i, \quad W_i = \frac{i}{\sum_{i=1}^{N} i} \tag{4}$$

$V_{N+1}$ is the predicted moving direction, N is the number of the multiple past time periods, $V_i$ is the current moving direction in the $i_{th}$ past time period, and $W_i$ is the attempt weight of the $i_{th}$ past time period.

For example, if the edge computation module 31 is configured to calculate the predicted moving direction based on the current moving directions of the target person 6 in four past time periods (taking the first uploading frequency to be three seconds for example, that is, three seconds ago, six seconds ago, nine seconds ago, and twelve seconds ago), the predicted moving direction may be calculated to be:

$$V_5 = V_1 \times \frac{1}{10} + V_2 \times \frac{2}{10} + V_3 \times \frac{3}{10} + V_4 \times \frac{4}{10}.$$

$V_5$ is the predicted moving direction, $V_1$ is the current moving direction in the time period of twelve seconds ago, $V_2$ is the current moving direction in the time period of nice seconds ago, $V_3$ is the current moving direction in the time period of six seconds ago, and $V_4$ is the current moving direction in the time period of three seconds ago. Here configures the attempt weight corresponding to the time period closest to the current time period to be the greatest for effectively considering the attempt of the target person 6 to change the moving direction. Thus, the deviation between the predicted moving direction being calculated and the actual moving direction may be decreased.

Specifically, the current moving direction indicates the vector from the location coordinate in the previous time period to the location coordinate in the current time period. That is, $V_t=(VX_t, VY_t, VZ_t)=P_t-P_{t-1}=(X_t-X_{t-1}, Y_t-Y_{t-1}, Z_t-Z_{t-1})$. $V_t$ is the vector of the current moving direction, $P_t$ is the location coordinate in the current time period (that is, $(X_t, Y_t, Z_t)$), and $P_{t-1}$ is the location coordinate in the previous time period (that is, $(X_{t-1}, Y_{t-1}, Z_{t-1})$).

Here uses the target person 6 moving on the planar space (that is, on the same floor) as an example. When the target person 6 moves across floors, the change on the Z-axis direction (that is, changing floor) may change the moving distance. Thus, when the positioning device 42, edge computation module 31, or data processor 22 determines that the target person 6 moves across floors, the aforementioned calculation manner needs to be adjusted.

Figure 10:
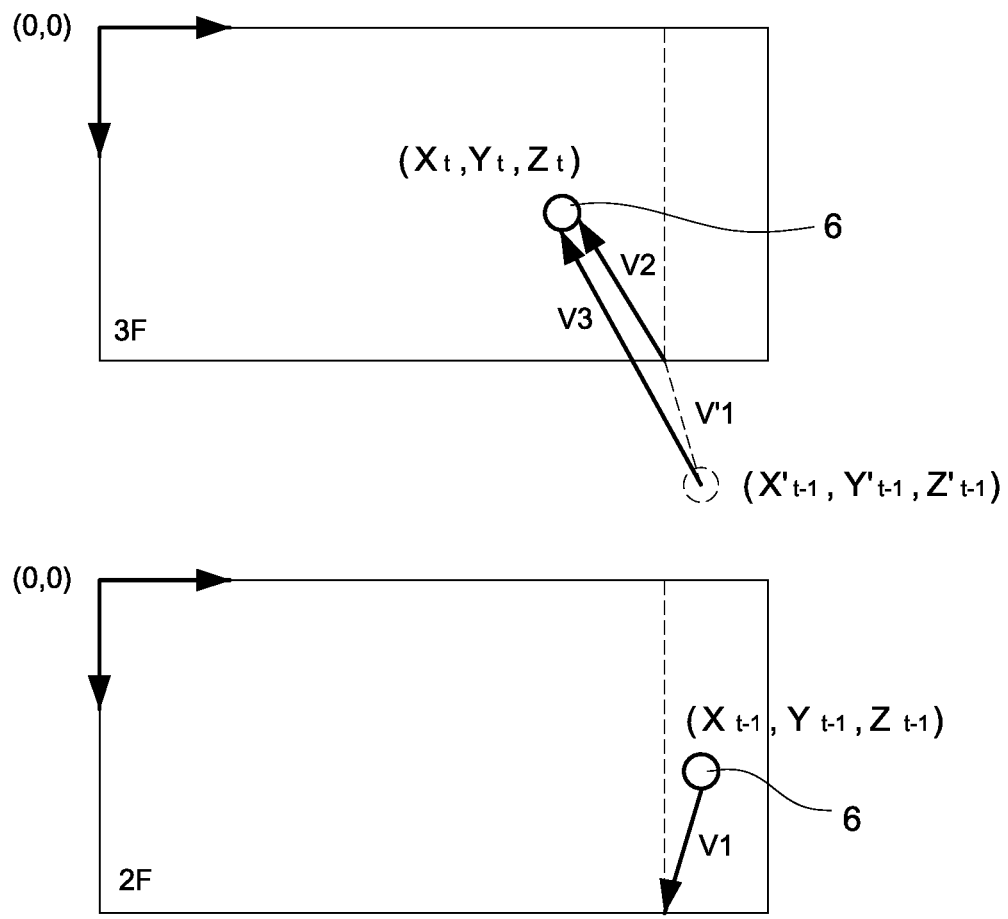
FIG. 10 is a schematic view of the person tracking in the first embodiment of this disclosure.

Refer to FIG. 10, which is a schematic view of the person tracking in the first embodiment of this disclosure. As shown in FIG. 10, when the location coordinate of the target person 6 shows that the target person 6 moves from the first location on the second floor $(X_{t-1}, Y_{t-1}, Z_{t-1})$ to the second location on the third floor $(X_t, Y_t, Z_t)$, the practical moving track is the first vector V1 plus the second vector V2.

Since the target person moves across floors, the edge computation module 31 (or data processor 22) practically needs to calculate the third vector V3, that is, the sum of the first mapping vector V1' and second vector V2. Thus, the edge computation module 31 needs to calculate the starting point of the first mapping vector V1' as follows.

$$P_{t-1}'=(X_{t-1}',Y_{t-1}',Z_{t-1}')=(X_{t-1},L_y\times 2-Y_{t-1},Z_{t-1})$$

$P_{t-1}'$ is the starting point (that is, $(X_{t-1}', Y_{t-1}', Z_{t-1}')$) of the first mapping vector V1', $L_y$ is the length of each floor of the building on the Y-axis direction.

When the target person 6 moves across floors, the technical feature of this disclosure is that the target person 6 may be effectively tracked, and the moving track of the target person 6 may be calculated through the compensation to the movement information of the target person 6 on the Y-axis direction.

It should be noted that apart from adjusting the predicted moving direction through the attempt weight, the edge computation module 31 may calculate the average vector length of the current moving directions in the multiple past time periods and adjust the vector length (that is, moving distance) of the predicted moving direction according to the average vector length.

In some embodiments, the edge computation module 31 uses the fifth formula and six formula as follows according to the current moving directions in the multiple past time periods to adjust the predicted moving direction being calculated.

The fifth formula is that:

$$L_N = \frac{1}{N}\sum_{i=1}^{N} |V_i| \qquad (5)$$

The sixth formula is that:

$$V\_Adj_{N+1} = \frac{L_N}{|V_{N+1}|}V_{N+1} \qquad (6)$$

$L_N$ is the average vector length of the current moving directions in the multiple past time periods, N is the total number of the multiple past time periods, $V_i$ and $|V_i|$ are the vector and length of the current moving direction in the $i_{th}$ past time period, $V\_Adj_{N+1}$ is the adjusted vector of the predicted moving direction, and $V_{N+1}$ and $|V_{N+1}|$ are the vector and length of the predicted moving direction before being adjusted.

This disclosure uses the moving direction and moving distance of the target person 6 in the past to adjust the predicted moving direction and moving distance calculated by the edge computation module 31 for improving the accuracy of the prediction result.

As described above, the data processor 22 of the intelligent building system 2 may store all the global 3D activity system information of the building (including the moving direction, predicted moving direction, moving distance, etc.) in the historical database of the data manager 24. Thus, the data processor 22 may further statistically analyze the moving tendency of all persons in the building 5.

For example, the historical information shows that one hundred persons in the building 5 (for example, a ten-story building) respectively move to the gym on the third floor from each floor between 06:00 pm and 06:30 pm. Forty persons depart from the first floor, ten persons depart from the fifth floor, thirty persons depart from the sixth floor, twenty persons depart from the eighth floor, and zero person depart from the other floors. In some embodiments, the data processor 22 may automatically perform the arrangement and regulation of the elevators according to the global 3D activity system information of the building in the historical database.

If the building 5 has three elevators, the data processor 22 may automatically configure one of the elevators to stop only at first floor, third floor, fifth floor, sixth floor, and eighth floor (that is, gym-related floors), and configure the other two elevators to stop only at the tenth floor, ninth floor, seventh floor, fourth floor, second floor, and first floor (that is, non-gym-related floors). As a result, the transportation for the persons during 06:00 pm and 06:30 pm may be effectively accelerated without the influence of the gym.

Moreover, the data processor 22 may statistically analyze the information of the persons related to the gym on the third floor according to the global 3D activity system information of the building in the historical database. As a result, the managing personnel of the building 5 may provide the business marketing information for the gym operator to understand the source of the members (for example, 60% of the members are from inside of the building 5 and 40% of the members are from outside of the building 5). Further, the gym operator may analyze the reason why there is no member on some floors (that is, tenth floor, ninth floor, seventh floor, fourth floor, and second floor) based on the information to make the marketing strategy for increasing the business opportunity.

Figure 11A:
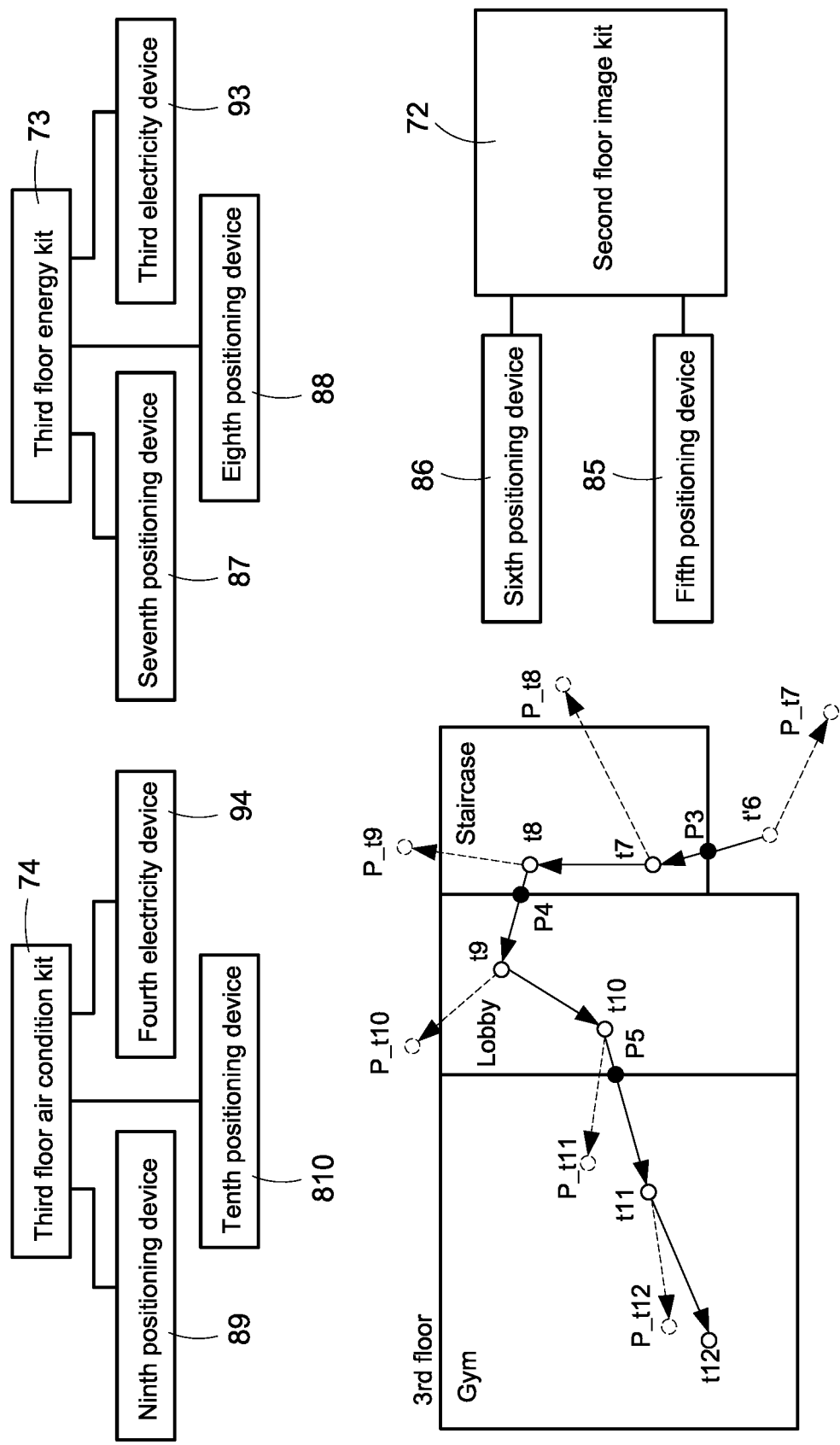
FIG. 11A is a schematic view of the first person tracking in the second embodiment of this disclosure.
Figure 11B:
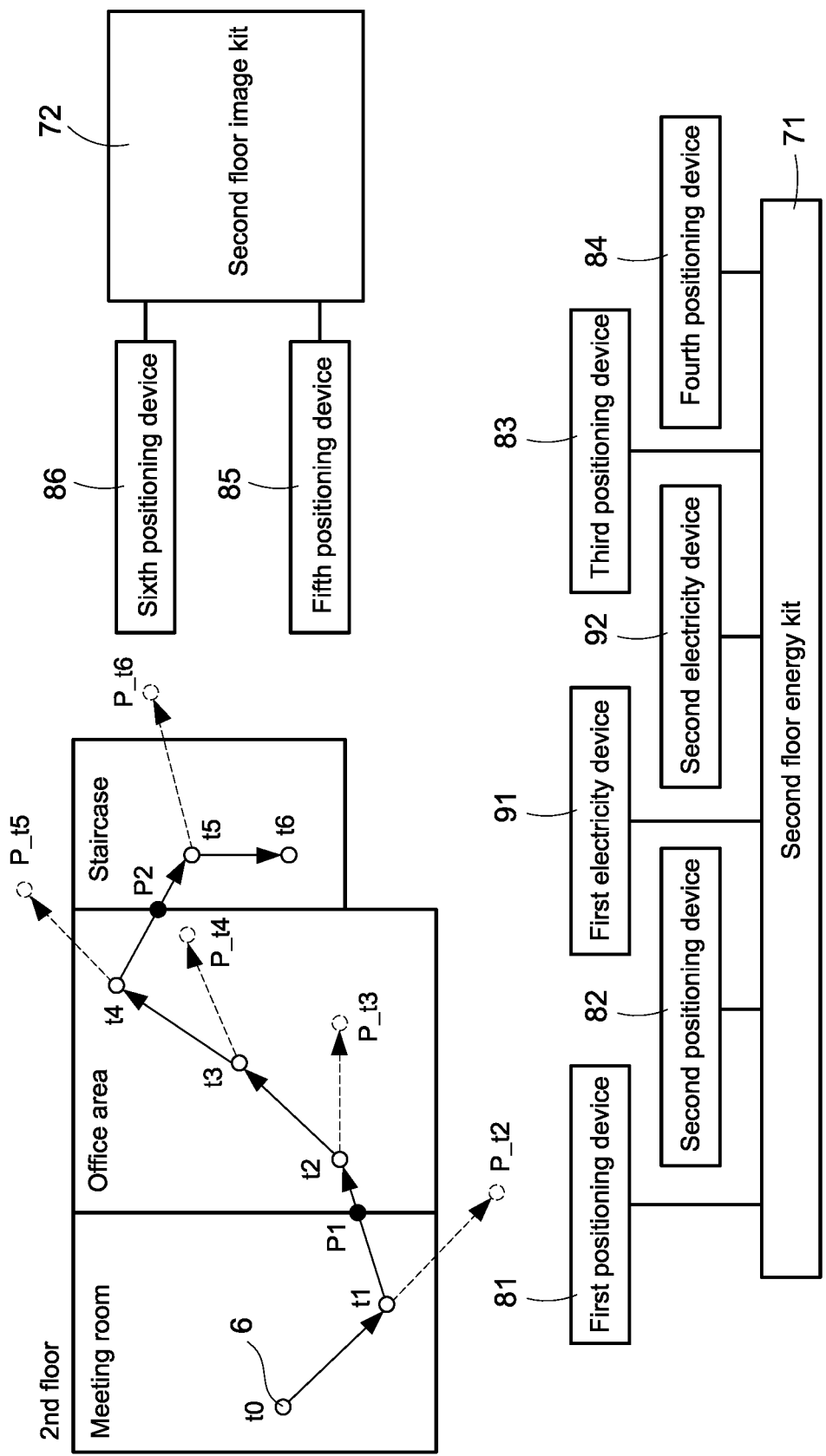
FIG. 11B is a schematic view of the second person tracking in the second embodiment of this disclosure.

Refer to FIG. 11A and FIG. 11B, which are schematic views of the first person tracking and second person tracking in the second embodiment of this disclosure. FIG. 11A and FIG. 11B shows how this disclosure tracks the target person 6 by the positioning device 42, intelligent building kit 3, and intelligent building system 2, and performs the intelligent control.

In FIG. 11A and FIG. 11B, the building has a meeting room, office area, and second-floor staircase on the second floor, and has third-floor staircase, lobby, and gym on the third floor. As shown in FIG. 11A and FIG. 11B, the integrated management system includes the first positioning device 81, second positioning device 82, and first electricity device 91 disposed in the second-floor meeting room, includes the third positioning device 83, fourth positioning device 84, and second electricity device 92 disposed in the second-floor office area, includes the fifth positioning device 85 disposed in the second-floor staircase, includes the sixth positioning device 86 disposed in the third-floor staircase, includes the seventh positioning device 87, eighth positioning device 88, and third electricity device 93 disposed in the third-floor lobby, and includes the ninth positioning device 89, tenth positioning device 810, and fourth electricity device 94 disposed in the third-floor gym.

Further, the integrated management system includes the second-floor energy kit 71 with the monitoring range corresponding to the meeting room and office area, includes the second-floor image kit 72 with the monitoring range corresponding to the second-floor staircase and third-floor staircase, includes the third-floor energy kit 73 with the monitoring range corresponding to the lobby, and includes the third-floor air-conditioning kit 74 with the monitoring range corresponding to the gym. Regarding the action of the integrated management system, here describes in the sequence from time point t0 to time point t12.

Timepoint t0: The second-floor energy kit 71 receives the information related to the target person 6 uploaded by the first positioning device 81 and second positioning device 82 to obtain the location coordinate of the target person 6 by using the related algorithm (for example, triangulation positioning), and configures the first kit-assigned ID (for example, KE_2F_0001). The second-floor energy kit 71 performs the intelligent control (for example, automatically activating the air-conditioning and lighting) to the air-conditioning and lighting of the meeting room according to the data, such as the locating coordinate and reference confidence index base value, etc., of the target person 6. Further, the second-floor energy kit 71 uploads the related information of the target person 6 to the data processor 22 to make the data processor 22 record the activity information of the second-floor meeting room.

Timepoint t1: The second-floor energy kit 71 receives the information uploaded by the first positioning device 81 and second positioning device 82 to obtain the location coordinate of the target person 6 by using the algorithm and confirms that the target person 6 is the same as the one in the previous time period. The second-floor energy kit 71 calculates the information, such as the moving direction, moving speed, predicted moving direction (that is, location P_t2), etc., of the target person 6 according to the algorithm. Similarly, the second-floor energy kit 71 performs the intelligent control (for example, automatically adjust the temperature of the air-conditioning and the illumination of the light) to the air-conditioning and lighting according to the data, such as the locating coordinate and reference confidence index base value, etc., of the target person 6, and uploads the related information to the data processor 22.

Timepoint t2: The second-floor energy kit 71 receives the information uploaded by the first positioning device 81 and second positioning device 82 to obtain that the target person 6 leaves the meeting room at location P1 by using the algorithm and performs the intelligent control (for example, automatically deactivating the air-conditioning and lighting) to the air-conditioning and lighting of the meeting room. At the same time, the second-floor energy kit 71 receives the information uploaded by the third positioning device 83 and fourth positioning device 84 to obtain the location coordinate of the target person 6 by using the algorithm, confirms that the target person 6 is the same with the one detected by the first positioning device 81 and second positioning device 82, and decides to keep using the first kit-assigned ID. Further, the second-floor energy kit 71 calculates the information, such as the moving direction, moving speed, predicted moving direction (that is, location P_t3), etc., of the target person 6 according to the algorithm, performs the intelligent control to the air-conditioning and lighting of the second-floor office area according to the data, such as the locating coordinate and reference confidence index base value, etc., of the target person 6, and uploads the related information to the data processor 22 to make the data processor 22 record the activity information of the office area.

Timepoint t3: The second-floor energy kit 71 receives the information uploaded by the third positioning device 83 and fourth positioning device 84 to obtain the location coordinate of the target person 6 by using the algorithm and confirms that the target person 6 is the same as the one in the previous time period. The second-floor energy kit 71 calculates the information, such as the moving direction, moving speed, predicted moving direction (that is, location P_t4), etc., of the target person 6 according to the algorithm. Similarly, the second-floor energy kit 71 performs the intelligent control to the air-conditioning and lighting of the office area according to the data, such as the locating coordinate and reference confidence index base value, etc., of the target person 6, and uploads the related information to the data processor 22.

Timepoint t4: The second-floor energy kit 71 receives the information of the target person 6 uploaded by the third positioning device 83 and fourth positioning device 84 to obtain the location coordinate of the target person 6 by using the algorithm and confirms that the target person 6 is the same with the one in the previous time period. The second-floor energy kit 71 calculates the information, such as the moving direction, moving speed, predicted moving direction (that is, location P_t5), etc., of the target person 6 according to the algorithm. Similarly, the second-floor energy kit 71 performs the intelligent control to the air-conditioning and lighting of the office area according to the data, such as the locating coordinate and reference confidence index base value, etc., of the target person 6, and uploads the related information to the data processor 22.

Timepoint t5: The second-floor energy kit 71 receives the information uploaded by the third positioning device 83 and fourth positioning device 84 to obtain the location coordinate of the target person 6 by using the algorithm, confirms that the target person 6 leaves the office area at location P2, and performs the intelligent control to the air-conditioning and lighting of the office area. At the same time, the second-floor image kit 72 receives the information uploaded by the fifth positioning device 85 to obtain the location coordinate of the target person 6 by using the algorithm, configures the second kit-assigned ID (for example, KV_2F3F_0001) of the target person 6, calculates the information, such as the moving direction, moving speed, predicted moving direction (that is, location P_t6), etc., of the target person 6 according to the algorithm, and performs the intelligent control to the lighting of the second-floor staircase according to the data, such as the locating coordinate and reference confidence index base value, etc., of the target person 6. Further, the second-floor image kit 72 uploads the related information of the target person 6 to the data processor 22. After the data processor 22 receives the related information of the second-floor image kit 72, apart from updating the activity information of the second-floor office area and second-floor staircase, the data processor 22 may determine that the first kit-assigned ID (KE_2F_0001) and second kit-assigned ID (KV_2F3F_0001) are corresponding to the same target person 6, thereby establishing the information connection of the first kit-assigned ID and second kit-assigned ID.

Timepoint t6: The second-floor image kit 72 receives the information uploaded by the fifth positioning device 85 to obtain the location coordinate of the target person 6 by using the algorithm and confirms that the target person 6 is the same as the one in the previous time period. The second-floor image kit 72 calculates the information, such as the moving direction, moving speed, predicted moving direction (that is, location P_t7), etc., of the target person 6 according to the algorithm. Similarly, the second-floor image kit 72 performs the intelligent control to the lighting of the second-floor staircase according to the data, such as the locating coordinate and reference confidence index base value, etc., of the target person 6, and uploads the related information of the target person 6 to the data processor 22.

Timepoint t7: The second-floor image kit 72 receives the information uploaded by the fifth positioning device 85 to obtain the location coordinate of the target person 6 by using the algorithm and confirms that the target person 6 leaves the second-floor staircase at location P3 and goes up to the third floor, and performs the intelligent control to the lighting of the second-floor staircase. At the same time, the second-floor image kit 72 receives the information uploaded by the sixth positioning device 86 to obtain the location coordinate of the target person 6 by using the algorithm, confirms that the target person 6 is the same as the one detected by the fifth positioning device 85, decides to keep using the second kit-assigned ID, calculates the information, such as the moving direction, moving speed, predicted moving direction (that is, location P_t8), etc., of the target person 6 according to the algorithm, and performs the intelligent control to the lighting of the third-floor staircase according to the data, such as the locating coordinate and reference confidence index base value, etc., of the target person 6. Further, the second-floor image kit 72 uploads the related information of the target person 6 to the data processor 22 to make the data processor 22 update the activity information of the second-floor staircase and third-floor staircase.

In some embodiments, the fifth positioning device 85 and sixth positioning device 86 may be the image-type positioning device.

Timepoint t8: The second-floor image kit 72 receives the information uploaded by the sixth positioning device 86 to obtain the location coordinate of the target person 6 by using the algorithm, and confirms that the target person 6 is the same as the one in the previous time period. The second-floor image kit 72 calculates the information, such as the moving direction, moving speed, predicted moving direction (that is, location P_t9), etc., of the target person 6 according to the algorithm. Similarly, the second-floor image kit 72 performs the intelligent control to the lighting of the third-floor staircase according to the data, such as the locating coordinate and reference confidence index base value, etc., of the target person 6, and uploads the related information to the data processor 22.

Timepoint t9: The second-floor image kit 72 receives the information uploaded by the sixth positioning device 86 to obtain the location coordinate of the target person 6 by using the algorithm, and confirms that the target person 6 leaves the third-floor staircase at location P4, and performs the intelligent control to the lighting of the third-floor staircase, and uploads the related information to the data processor 22. At the same time, the third-floor energy kit 73 receives the information uploaded by the seventh positioning device 87 and eighth positioning device 88 to obtain the location coordinate of the target person 6 by using the algorithm, configures the third kit-assigned ID (for example, KE_3F_0001), calculates the information, such as the moving direction, moving speed, predicted moving direction (that is, location P_t10), etc., of the target person 6 according to the algorithm, and performs the intelligent control to the air-conditioning and lighting of the third-floor lobby according to the data, such as the locating coordinate and reference confidence index base value, etc., of the target person 6. Further, the third-floor energy kit 73 uploads the related information of the target person 6 to the data processor 22. After the data processor 22 receives the related information of the third-floor energy kit 73, apart from updating the activity information of the third-floor staircase and third-floor lobby, the data processor 22 may determine that the second kit-assigned ID (KV_2F3F_0001) and third kit-assigned ID (KE_3F_0001) are corresponding to the same target person 6, thereby establishing the information connection of the second kit-assigned ID and third kit-assigned ID.

Timepoint t10: The third-floor energy kit 73 receives the information uploaded by the seventh positioning device 87 and eighth positioning device 88 to obtain the location coordinate of the target person 6 by using the algorithm and confirms that the target person 6 is the same as the one in the previous time period. The third-floor energy kit 73 calculates the information, such as the moving direction, moving speed, predicted moving direction (that is, location P_t11), etc., of the target person 6 according to the algorithm. Similarly, the second-floor energy kit 71 performs the intelligent control to the air-conditioning and lighting of the lobby according to the data, such as the locating coordinate and reference confidence index base value, etc., of the target person 6, and uploads the related information to the data processor 22.

Timepoint t11: The third-floor energy kit 73 receives the information uploaded by the seventh positioning device 87 and eighth positioning device 88 to obtain the location coordinate of the target person 6 by using the algorithm, confirms that the target person 6 leaves the third-floor lobby at location P5, performs the intelligent control to the air-conditioning and lighting of the lobby, and uploads the related information to the data processor 22. At the same time, the third-floor air-conditioning kit 74 receives the information uploaded by the ninth positioning device 89 and tenth positioning device 810 to obtain the location coordinate of the target person 6 by using the algorithm, configures the fourth kit-assigned ID (for example, KH_3F_0001), calculates the information, such as the moving direction, moving speed, predicted moving direction (that is, location P_t12), etc., of the target person 6 according to the algorithm, and performs the intelligent control to the air-conditioning and lighting of gym according to the data, such as the locating coordinate and reference confidence index base value, etc., of the target person 6. Further, the third-floor air-conditioning kit 74 uploads the related information to the data processor 22. After the data processor 22 receives the related information of the third-floor air-conditioning kit 74, apart from updating the activity information of the third-floor lobby and third-floor gym, the data processor 22 may determine that the third kit-assigned ID (KE_3F_0001) and fourth kit-assigned ID (KH_3F_0001) are corresponding to the same target person 6, thereby establishing the information connection of the third kit-assigned ID and fourth kit-assigned ID.

Timepoint t12: The third-floor air-conditioning kit 74 receives the information uploaded by the ninth positioning device 89 and tenth positioning device 810 to obtain the location coordinate of the target person 6 by using the algorithm and confirms that the target person 6 is the same as the one in the previous time period. The third-floor air-conditioning kit 74 calculates the information, such as the moving direction, moving speed, predicted moving direction, etc., of the target person 6 according to the algorithm. Similarly, the third-floor air-conditioning kit 74 performs the intelligent control to the air-conditioning and lighting of the gym according to the data, such as the locating coordinate and reference confidence index base value, etc., of the target person 6, and uploads the related information to the data processor 22.

With respect to the technical features of this disclosure, the positioning and tracking for the person in multi-area or multi-floor may be performed in the building, and the intelligent control may be performed to each area in the building according to the statuses of the persons (for example, population, activity level, etc.) in the building to fulfill the need of the user to make the operation of an intelligent building practical.

While this disclosure has been described by means of specific embodiments, numerous adjustments and variations may be made thereto by those skilled in the art without departing from the scope and spirit of this disclosure set forth in the claims.

What is claimed is:

1. An integrated intelligent building management system, comprising:
   at least one positioning device, disposed in an area inside a building, when at least one target person is detected in the area, and configured to set a device-assigned ID to the target person, to record a movement information of the target person according to a sampling rate, and to upload the device-assigned ID and the movement information according to a first uploading frequency, wherein the movement information comprises a location coordinate and a coordinate of leaving a positioning range of the target person;
   at least one intelligent building kit, connected with the at least one positioning device, continuously receiving the device-assigned ID and the movement information of the target person from the positioning device, and configured to compute a moving track and an average moving speed of the target person in the positioning range of the positioning device according to the location coordinates of the target person in multiple past time periods, when a plurality of the device-assigned IDs uploaded by a plurality of the positioning devices adjacent to each other are determined to be corresponding to a same target person according to the coordinate of leaving the positioning range, the moving track, and the average moving speed, transforming the multiple device-assigned IDs to a kit-assigned ID, and to upload the kit-assigned ID and the movement information of the target person according to a second uploading frequency; and
   an intelligent building system, comprising a data manager and connected with the at least one intelligent building kit, and configured to continuously receive the kit-assigned ID and the movement information of the target person from the intelligent building kit, to compute the moving track and the average moving speed of the target person in a responsible area of the intelligent building kit according to the location coordinate of the target person in the multiple past time periods, and when a plurality of the kit-assigned IDs uploaded by a plurality of the intelligent building kits adjacent to each other are determined to be corresponding to the same target person according to the coordinate of leaving the positioning range, the moving track, and the average moving speed, to establish an information connection for the multiple kit-assigned IDs,
   wherein the intelligent building kit comprises an edge computation module, configured to select an environment optimization parameter correspondingly in real-time to execute an intelligent control procedure to the area according to a population density and a person activity level in the area;
   wherein the intelligent building kit is configured to record an area size of the area relative to the building, the edge computation module is configured to compute the population density according to the area size and a total number of the target persons in the area, and to determine an activity category of each target person according to the movement information of one or a plurality of the target persons, and to compute the person activity level of the area according to the activity category of each target person.

2. The integrated intelligent building management system of claim 1, wherein the environment optimization parameter is corresponding to an air-conditioning temperature and a fan speed of the area.

3. The integrated intelligent building management system of claim 1, wherein the building comprises a virtual 3D coordinate system, configured to relate one corner on a first floor of the building to an origin, to relate a direction toward east to an X-axis, to relate a direction toward north to a Y-axis, and to relate a floor direction to a Z-axis, and the intelligent building kit is configured to determine the area range according to multiple vertex coordinates of a preset area frame of the area on the virtual 3D coordinate system, and to compute an area size.

4. The integrated intelligent building management system of claim 3, wherein the intelligent building kit is configured to compute a moving speed standard deviation of the target person according to the location coordinate of the target person in the multiple past time periods, the edge computation module is configured to execute a deep learning algorithm to determine the activity category of the target person according to the moving track, the average moving speed, and the moving speed standard deviation, wherein the activity category is related to an activity grade, the edge computation module is configured to add up the activity grade of all the target persons in the area and divide that by the total number of the target persons to calculate the person activity level of the area.

5. The integrated intelligent building management system of claim 3, wherein the positioning device comprises an image-type positioning device, a tag-type positioning device, or a non-tag-type positioning device, the device-assigned ID is composed by at least one of a category code, a device number, a timestamp and a serial number of the positioning device, wherein the category code indicates a current positioning manner of the target person.

6. The integrated intelligent building management system of claim 5, wherein a plurality of the positioning devices are located in the area, and the multiple positioning devices are configured to execute an angle of arrival (AOA) algorithm or a time of arrival (TOA) algorithm to calculate the location coordinate of the target person.

7. The integrated intelligent building management system of claim 5, wherein the image-type positioning device is configured to identify the target person through an image identification procedure and track the target person through an object tracking algorithm;
the tag-type positioning device is configured to read a tag worn by the target person to identify and track the target person;
the non-tag-type positioning device is configured to sense and compute a first movement vector of an object in the area, and to compute an angle between the first movement vector and a second movement vector of the object provided by another non-tag-type positioning device in the area to identify the object as the target person and track the target person.

8. The integrated intelligent building management system of claim 5, wherein the edge computation module is configured to select the environment optimization parameter according to the population density, the person activity level, and a persons-occupied area percentage in the area.

9. The integrated intelligent building management system of claim 8, wherein the edge computation module is configured to determine a person-presence range based on the location coordinate of all the target persons in the area and calculate a person-presence area size, and to calculate the persons-occupied area percentage of the area according to the person-presence area size and the area size.

10. The integrated intelligent building management system of claim 6, wherein the edge computation module is configured to select the environment optimization parameter according to the population density, the person activity level, and an area reference confidence index, wherein the edge computation module is configured to calculate the area reference confidence index according to a personal reference confidence index of all the target persons in the area.

11. The integrated intelligent building management system of claim 10, wherein area reference confidence index comprises an area index base value, an area index upper limit, and an area index lower limit, the personal reference confidence index comprises a personal index base value, a personal index upper limit, a personal index lower limit, the edge computation module is configured to calculate an average value of the personal index base values of all the target persons in the area to be the area index base value, and to obtain a maximal value of the personal index upper limits of all the target persons to be the area index upper limit, and to obtain a minimal value of the personal index lower limits of all the target persons to be the area index lower limit, wherein the edge computation module is configured to select different environment optimization parameters when the area index base value is in a range close to the area index upper limit, when the area index base value is in a range close to the area index lower limit, and when the area index base value is between the area index upper limit and the area index lower limit.

12. The integrated intelligent building management system of claim 11, wherein the edge computation module is configured to obtain a preset base value and a preset adjustment value according to the current positioning manner of the target person, and to calculate a difference value between the preset base value in a previous time period and the preset base value in a current time period, and to calculate the personal index base value of the target person in the current time period with respect to a product of the difference value and the personal index base value in the previous time period.

13. The integrated intelligent building management system of claim 12, wherein the edge computation module is configured to add an upper limit adjustment value to the preset base value to generate the personal index upper limit, and to add a lower limit adjustment value to the preset base value to generate the personal index lower limit, wherein the edge computation module is configured to calculate the upper limit adjustment value and the lower limit adjustment value based on the preset adjustment value and a moving direction predicted deviation of the target person.

14. The integrated intelligent building management system of claim 13, wherein the edge computation module is configured to calculate the upper limit adjustment value and the lower limit adjustment value based on the preset adjustment value, the moving direction predicted deviation, and an adjustment unit.

15. The integrated intelligent building management system of claim 14, wherein the edge computation module is configured to calculate a current moving direction of the target person according to the location coordinate in the current time period and the location coordinate in the previous time period of the target person, and to calculate the moving direction predicted deviation according to the current moving direction and a predicted moving direction in the previous time period.

16. The integrated intelligent building management system of claim 15, wherein the current moving direction and the predicted moving direction respectively comprise a vector length, the moving direction predicted deviation is a vector angle between the current moving direction and the predicted moving direction in the previous time period, and the edge computation module is configured to obtain a deviation level corresponding to a value of the vector angle, wherein the deviation level is directly proportional to the vector angle.

17. The integrated intelligent building management system of claim 15, wherein the edge computation module is configured to calculate the predicted moving direction according to the current moving directions in the multiple past time periods, wherein the current moving direction in each past time period is corresponding to an attempt weight, the attempt weight corresponding to the past time period closest to the current time period is greatest, and a sum of the attempt weights of all the past time periods is one.

18. The integrated intelligent building management system of claim 17, wherein the current moving direction and the predicted moving direction respectively comprise a vector length, the edge computation module is configured to calculate an average vector length of the current moving direction in the multiple past time periods, and to adjust the vector length of the predicted moving direction according to the average vector length.

19. The integrated intelligent building management system of claim 1, wherein the intelligent building kit is configured to upload a calculation and control content executed by the edge computation module with respect to all the areas in the monitoring range according to the second uploading frequency, and the intelligent building system is configured to execute a compensating calculation and control procedure for the edge computation module through the data manager.

* * * * *